United States Patent
Shinchi

(10) Patent No.: US 10,747,485 B2
(45) Date of Patent: Aug. 18, 2020

(54) IMAGE FORMING APPARATUS

(71) Applicant: Konica Minolta, Inc., Chiyoda-ku, Tokyo (JP)

(72) Inventor: Toshimi Shinchi, Saitama (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/724,936

(22) Filed: Dec. 23, 2019

(65) Prior Publication Data

US 2020/0210119 A1 Jul. 2, 2020

(30) Foreign Application Priority Data

Dec. 26, 2018 (JP) .................... 2018-242861

(51) Int. Cl.
*G06F 3/12* (2006.01)
*B41J 3/44* (2006.01)

(52) U.S. Cl.
CPC .............. *G06F 3/1237* (2013.01); *B41J 3/44* (2013.01); *G06F 3/1286* (2013.01); *G06F 3/1293* (2013.01)

(58) Field of Classification Search
None
See application file for complete search history.

(56) References Cited

U.S. PATENT DOCUMENTS

2015/0378652 A1* 12/2015 Sakurai .............. H04N 1/00204
358/1.15
2016/0239804 A1* 8/2016 Buchmueller ....... G08G 5/0069
2016/0274840 A1* 9/2016 Bannai .................. G06F 21/608
2017/0038780 A1* 2/2017 Fandetti ............... G06Q 10/083
2017/0269878 A1* 9/2017 Taniguchi ............ G05D 1/0282
2018/0058864 A1* 3/2018 Lection .............. G06Q 30/0631
2019/0377532 A1* 12/2019 Garrison ............ H04N 1/00363
2020/0050408 A1* 2/2020 Wushour .................. B64F 1/22

FOREIGN PATENT DOCUMENTS

JP 2017-087524 5/2017
JP 2017-087524 A 5/2017
JP 2017087524 A * 5/2017

\* cited by examiner

Primary Examiner — Ted W Barnes
(74) Attorney, Agent, or Firm — BakerHostetler

(57) ABSTRACT

An image forming apparatus cooperates with a flying vehicle, and includes: a communicator that exchanges data with another device; a printer that performs printing on a paper sheet; a storage that stores positional information of seats, positional information of image forming apparatuses, and a moving speed of the flying vehicle; and a hardware processor that controls the image forming apparatus, wherein the hardware processor is to: obtain delivery destination information from a print job; receive positional information from the flying vehicle; read out the positional information of a seat as a delivery destination and the positional information of the image forming apparatuses; calculate a travel time until the flying vehicle reaches the delivery destination; transfer the print job to another image forming apparatus; and transmit information regarding the other image forming apparatus to the flying vehicle via the communicator.

16 Claims, 20 Drawing Sheets

| MAP IDENTIFIER | COORDINATES | PHYSICAL POSITION |
|---|---|---|
| M0001 | 1-A | (0, 0) |
| M0002 | 1-B | (0, 1) |
| M0003 | 1-C | (0, 2) |
| M0004 | 1-D | (0, 3) |
| ⋮ | ⋮ | ⋮ |
| M0048 | 8-F | (7, 5) |

FIG. 8
411

| STAFF MEMBER IDENTIFIER (801) | NAME (802) | AFFILIATION (803) | DETAILED INFORMATION (804) |
|---|---|---|---|
| E0001 | TANAKA | SALES | ... |
| E0002 | KATO | SALES | ... |
| E0003 | SATO | SALES | ... |
| E0004 | SUZUKI | DEVELOPMENT | ... |
| E0005 | SAITO | GENERAL AFFAIRS | ... |
| E0006 | NAKAJIMA | DEVELOPMENT | ... |

FIG. 9
412

| SEAT IDENTIFIER (901) | MAP IDENTIFIER (902) | STAFF MEMBER IDENTIFIER (903) |
|---|---|---|
| S0001 | M0001 | E0001 |
| S0002 | M0004 | E0002 |
| S0003 | M0024 | E0003 |
| S0004 | M0030 | E0004 |
| S0005 | M0031 | E0005 |
| S0006 | M0048 | E0006 |

| MOVING VEHICLE IDENTIFIER ~1001 | IP ADDRESS ~1002 | FLIGHT SPEED ~1003 | CURRENT POSITION ~1004 | DESTINATION ~1005 | STATUS ~1006 | REMAINING BATTERY LEVEL ~1007 |
|---|---|---|---|---|---|---|
| D0001 | 192.168··· | 70km/h | M0015 | M0013 | FREE | 78 |
| D0002 | 192.168··· | 50km/h | M0040 | M0048 | DURING DELIVERY | 38 |

FIG. 12  414

| DEVICE IDENTIFIER 1201 | POSITION 1202 | PRINT SPEED 1203 | FUNCTION 1204 | STATUS 1205 | MOVING VEHICLE SET FLAG 1206 |
|---|---|---|---|---|---|
| P0001 | M0006 | 50ppm | ... | PRINTING | 1 |
| P0002 | M0013 | 60ppm | ... | STANDBY | 0 |
| P0003 | M0028 | 100ppm | ... | STANDBY | 1 |
| P0004 | M0043 | 100ppm | ... | PRINTING | 0 |

IMAGE FORMING APPARATUS

This application claims priority to Japanese patent Application No. 2018-242861, filed on Dec. 26, 2018, the entire disclosure of which is incorporated herein by reference in its entirety.

BACKGROUND

Technological Field

The present disclosure relates to an image forming apparatus, and more particularly, to an image forming apparatus that cooperates with a flying vehicle.

Description of the Related Art

In a spacious office or the like, a plurality of staff members often shares and uses an image forming apparatus, such as a multi-function peripheral (MFP), connected to a network. In such a case, a staff member at a seat far from the image forming apparatus needs to move a long distance each time printing is performed. In addition, in a slender office or in an L-shaped office, it may be necessary to move a long distance to hand printed material to other staff members at very distant seats. It is a waste on the job for the staff members to constantly move a long distance to collect printed material, and it has been required to reduce those operations.

In recent years, there has been remarkable development of a flying vehicle called drone, and a delivery system of printed material using a flying vehicle has been devised. For example, JP 2017-87524 A discloses "a printed material delivery system including one or more image forming apparatuses, one or more unmanned air vehicles equipped with a delivery case for delivering printed material output by the image forming apparatus, and an information processor that receives a print job from one or more user terminals, in which the information processor includes a user information generation unit that generates user information including a delivery destination of printed material for a user who is a transmission source of the print job and user authentication information, a print request unit that transmits a print request including the print job and the generated user information to the image forming apparatus, and a delivery request unit that transmits a delivery request designating the image forming apparatus that has transmitted the print request as a consignee to the unmanned air vehicle" ([Abstract]).

According to the technique disclosed in JP 2017-87524 A, the delivery time of printed material by the flying vehicle may be extremely long. Therefore, there has been a need for a technique of shortening the delivery time of printed material by a flying vehicle.

SUMMARY

The present disclosure has been conceived in view of the above background, and an object in one aspect is to provide a technique for shortening a delivery time of printed material by a flying vehicle.

To achieve the abovementioned object, according to an aspect of the present invention, there is provided an image forming apparatus that cooperates with a flying vehicle, and the image forming apparatus reflecting one aspect of the present invention comprises: a communicator that exchanges data with another device; a printer that performs printing on a paper sheet; a storage that stores positional information of a plurality of seats, positional information of a plurality of image forming apparatuses, and a moving speed of the flying vehicle; and a hardware processor that controls the image forming apparatus, wherein the hardware processor is to: obtain delivery destination information from a print job received via the communicator; receive positional information from the flying vehicle via the communicator; read out the positional information of a seat as a delivery destination and the positional information of the image forming apparatuses from the storage; calculate a travel time until the flying vehicle reaches the delivery destination after passing through any one of the image forming apparatuses on the basis of the positional information of the seat as a delivery destination, the positional information of the image forming apparatuses, and the moving speed and the positional information of the flying vehicle; transfer the print job to another image forming apparatus that minimizes a delivery time at a time when the flying vehicle collects printed material and delivers the printed material to the delivery destination on the basis of a result of the calculation of the travel time until the delivery destination is reached; and transmit information regarding the other image forming apparatus to the flying vehicle via the communicator.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a table illustrating an exemplary staff member table;

FIG. 9 is a table illustrating an exemplary seat table;

FIG. 10 is a table illustrating an exemplary moving vehicle table;

FIG. 12 is a table illustrating an exemplary device table;

DETAILED DESCRIPTION OF EMBODIMENTS

Hereinafter, one or more embodiments of the present invention will be described with reference to the drawings. However, the scope of the invention is not limited to the disclosed embodiments. The same components are denoted by the same reference signs in the following descriptions. Names and functions thereof are also the same. Detailed descriptions thereof will not be repeated, accordingly.

A. System Configuration

Figure 1:
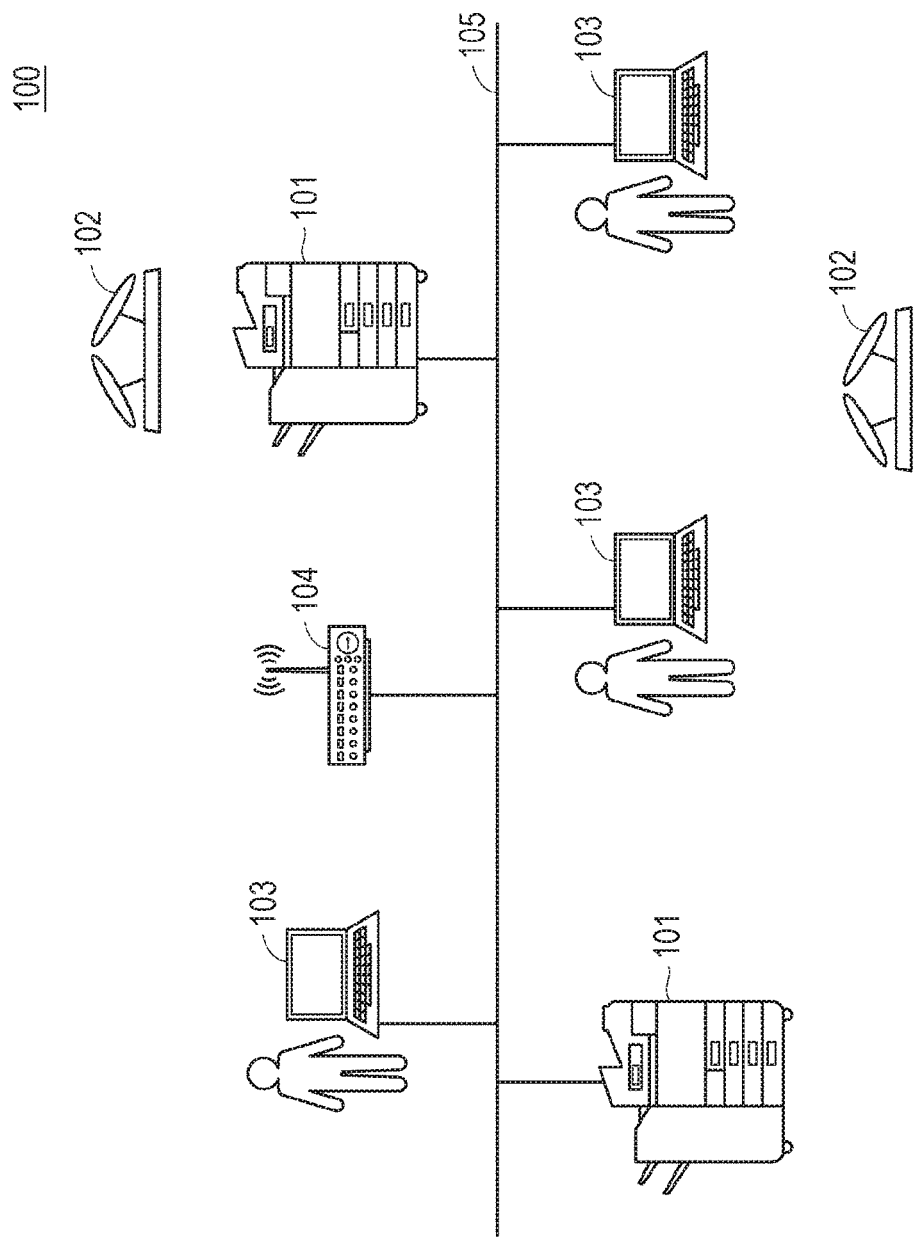
FIG. 1 is a diagram illustrating an exemplary configuration of a system according to an embodiment.

FIG. 1 is a diagram illustrating an exemplary configuration of a system according to the present embodiment. With reference to FIG. 1, the system according to the present embodiment includes an image forming apparatus 101, a flying vehicle 102, a terminal device 103, a wireless device 104, and a wired network 105.

The image forming apparatus 101 is connected to the wired network 105 by wire or wirelessly. Further, the image forming apparatus 101 can receive a print job from the terminal device 103 via the wired network 105 and perform printing. One or more image forming apparatuses 101 have a function as a server that manages positional information of another image forming apparatus 101, the terminal device 103, seats, and the flying vehicle 102.

The image forming apparatus 101 may further have functions of, in addition to printing, paper scanning, stapling, and print job transfer. Furthermore, the image forming apparatus 101 may include a stand on which the flying vehicle 102 can land, and a function of charging the flying vehicle 102. An MFP may be used as the image forming apparatus 101 in one aspect.

The flying vehicle 102 collects paper sheets printed by the image forming apparatus 101, and delivers the collected paper sheets to the terminal device 103, a seat, or a place where a person is present. The flying vehicle 102 periodically communicates with the image forming apparatus 101 wirelessly. At that time, the flying vehicle 102 may communicate with the image forming apparatus 101 via the wireless device 104, or may communicate with the image forming apparatus 101 via dedicated wireless equipment. The flying vehicle 102 may incorporate a wireless charging function, and may be charged on a charging stand provided on the image forming apparatus 101.

The flying vehicle 102 may periodically communicate with a plurality of beacons in the office to obtain the current position, and may transmit the current positional information of its own device to the image forming apparatus 101. Further, the flying vehicle 102 may periodically communicate with a plurality of image forming apparatuses 101 wirelessly to identify the current position from the wireless communication strength with each of the image forming apparatuses 101, and may transmit the current positional information of its own device to the image forming apparatuses 101. A drone including a plurality of propellers may be used as the flying vehicle 102 in one aspect.

The terminal device 103 is used by staff members or visitors in the office. The terminal device 103 is connected to the wired network 105 by wire or wirelessly. Further, the terminal device 103 can transmit a print job to the image forming apparatus 101 via the wired network 105.

Furthermore, the terminal device 103 may be capable of installing driver software for communicating with the image forming apparatus 101. The terminal device 103 may download the driver software from a web server in the image forming apparatus 101 or from an external web server, or may install the driver software from another storage medium. A personal computer (PC) may be used as the terminal device 103 in one aspect.

The wireless device 104 is wirelessly connected to the image forming apparatus 101, the flying vehicle 102, and the terminal device 103. The wireless device 104 enables mutual communication between a device connected wirelessly and a device connected to the wired network 105. A Wireless Fidelity (Wi-Fi) (registered trademark) router may be used as the wireless device 104 in one aspect.

The wired network 105 is a wired communication network including cables and the like, which is connected to the image forming apparatus 101, the terminal device 103, and the wireless device 104. The wired network 105 may be a local area network (LAN) that communicates using a transmission control protocol/internet protocol (TCP/IP). Ethernet (registered trademark) may be used as the wired network 105 in one aspect.

In the following descriptions, in a case where image forming apparatuses, flying vehicles, or terminal devices are referred to as an individual device, the device is denoted by a reference numeral with an individual code added at the end thereof, such as image forming apparatuses 101A to 101Z, flying vehicles 102A to 102Z, and terminal devices 103A to 103Z. On the other hand, in a case where image forming apparatuses, flying vehicles, or terminal devices are collectively referred to as devices of the same type, the devices are denoted as the image forming apparatus 101, the flying vehicle 102, or the terminal device 103.

Figure 2:
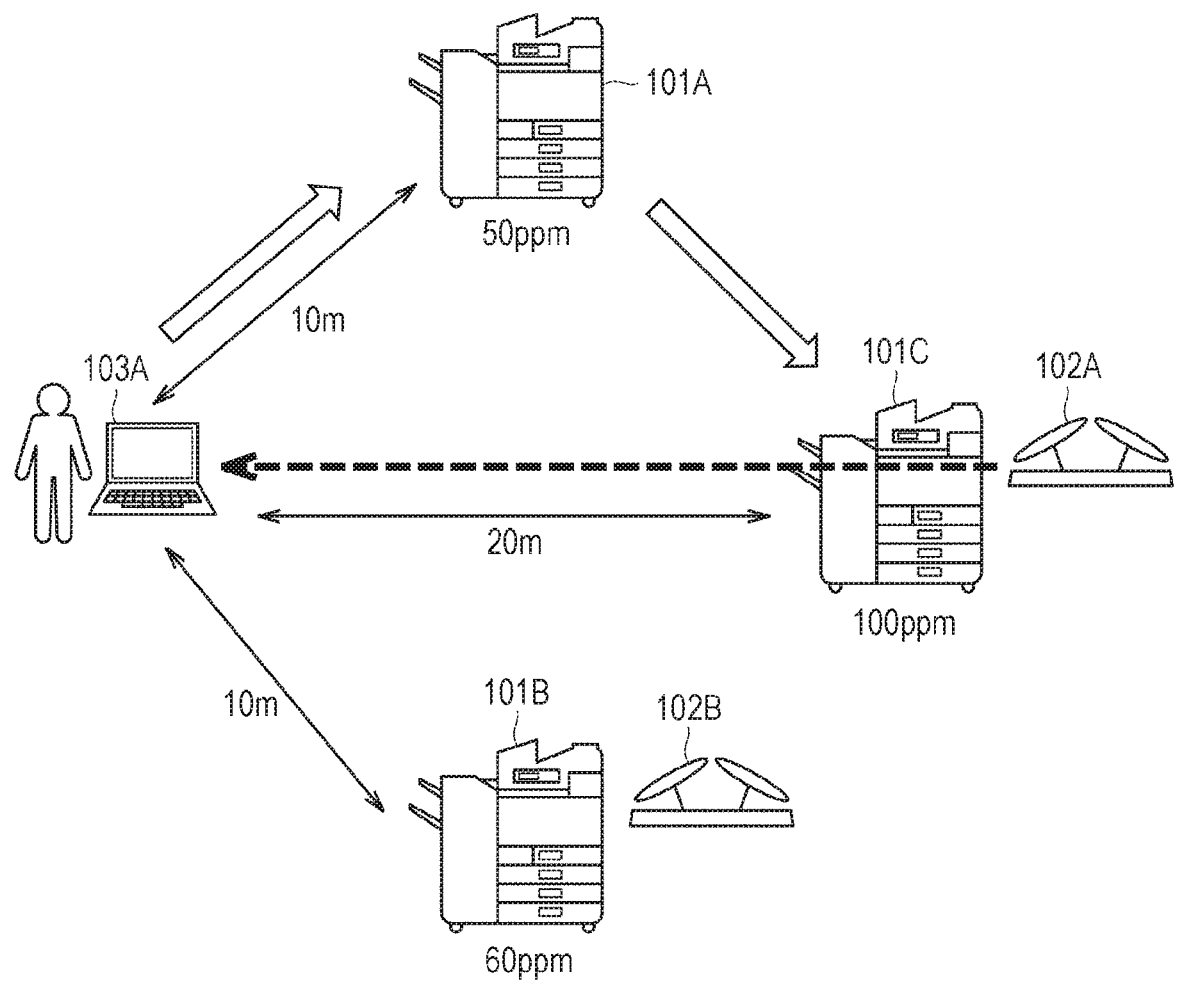
FIG. 2 is a diagram illustrating an exemplary operation outline of a system according to an embodiment.

FIG. 2 is a diagram illustrating an exemplary operation outline of the system according to the present embodiment. With reference to FIG. 2, basic operation of the system according to the present embodiment will be described. There are installed a terminal device 103A, an image forming apparatus 101A, an image forming apparatus 101B, and an image forming apparatus 101C in a certain office.

A print speed of the image forming apparatus 101A is 50 pages per minute (ppm). A print speed of the image forming apparatus 101B is 60 ppm. A print speed of the image forming apparatus 101C is 100 ppm. A distance from the image forming apparatus 101A and the image forming apparatus 101B to the terminal device 103A is 10 meters. A distance from the image forming apparatus 101C to the terminal device 103A is 20 meters. The terminal device 103A sets the image forming apparatus 101A as a prescribed image forming apparatus 101.

Two flying vehicles 102A and 102B are flying in the office. The current flight position of the flying vehicle 102A is near the image forming apparatus 101C. The current flight position of the flying vehicle 102B is near the image forming apparatus 101B.

It is assumed that a staff member wants to print text data created by an application in the terminal device 103A on a paper sheet, and wants any of the flying vehicles 102 to deliver printed material to his/her seat. First, the staff member transmits a print job to the image forming apparatus 101A via driver software installed in the terminal device 103A. The print job includes, as a print setting, a "delivery request" for the flying vehicle 102A to deliver the printed material to the seat. A printer job language (PJL) may be used for the print job in one aspect.

The image forming apparatus 101A obtains the "destination" or "current position" of the current flying vehicle 102 on the basis of the "delivery request" included in the print job. The image forming apparatus 101A may periodically communicate with the flying vehicle 102 to store the flight position of the flying vehicle 102 inside thereof, or may request the flying vehicle 102 to provide the destination and the positional information at the timing of receiving the print job. In one aspect, one of the image forming apparatuses 101 in the office may be a management server that manages positions of all seats, the image forming apparatuses 101, and the flying vehicles 102. In that case, the image forming apparatus 101A that has received the print job inquires of the management server about the "destination" or "current position" of the flying vehicle 102.

Next, the image forming apparatus 101A selects a combination of the image forming apparatus 101 and the flying vehicle 102 such that a "waiting time until the printed material is delivered to the staff member" is minimized. The "waiting time until the printed material is delivered to the staff member" is dependent on a "time required for executing the print job of the image forming apparatus 101" and a "travel time of the flying vehicle 102".

In a case where the number of sheets to be printed in the print job is small, the influence of the "time required for executing the print job of the image forming apparatus 101" in the "waiting time until the printed material is delivered to the staff member" is reduced. On the other hand, in a case where the number of sheets to be printed in the print job is large, the influence of the "time required for executing the print job of the image forming apparatus 101" in the "waiting time until the printed material is delivered to the staff member" increases.

As an example, the influence of the print speed in the case of selecting a combination A (image forming apparatus 101B and flying vehicle 102B) and in the case of selecting a combination B (image forming apparatus 101C and flying vehicle 102A) will be described. The distance between the image forming apparatus 101B and the terminal device 103A is shorter than the distance between the image forming apparatus 101C and the terminal device 103A. However, the print speed of the image forming apparatus 101B is slower than the print speed of the image forming apparatus 101C.

In the case mentioned above, in the case where the number of sheets to be printed in the print job is small, the "waiting time until the printed material is delivered to the staff member" is more likely to be reduced when the image forming apparatus 101A selects the combination A. On the other hand, in the case where the number of sheets to be printed in the print job is large, the "waiting time until the printed material is delivered to the staff member" is more likely to be reduced when the image forming apparatus 101A selects the combination B. In the example illustrated in FIG. 2, the image forming apparatus 101A selects the combination B, and transfers the print job to the image forming apparatus 101C.

The image forming apparatus 101C prints the received print job. The flying vehicle 102A receives transfer information of the print job from the image forming apparatus 101A or the image forming apparatus 101C, and heads to the image forming apparatus 101C. When the flying vehicle 102A collects the printed material from the image forming apparatus 101C, it delivers the printed material to the seat where the terminal device 103A is positioned. After delivering the printed material, the flying vehicle 102A may return to the image forming apparatus 101B that has been passed most recently, or to another image forming apparatus 101 most frequently passed, unless a delivery instruction is received.

A purpose of a system according to one aspect of the present embodiment is to minimize the waiting time until the printed material is delivered to the staff member. In the system according to the present embodiment, a print job is transferred in advance between the multiple image forming apparatuses 101 installed in the office, whereby the waiting time until the printed material is delivered to the destination (hereinafter referred to as delivery time) can be minimized Note that the delivery time includes a "printing time" of the print job of the image forming apparatus 101, and a "travel time" required for the delivery of the printed material by the flying vehicle 102.

Figure 3:
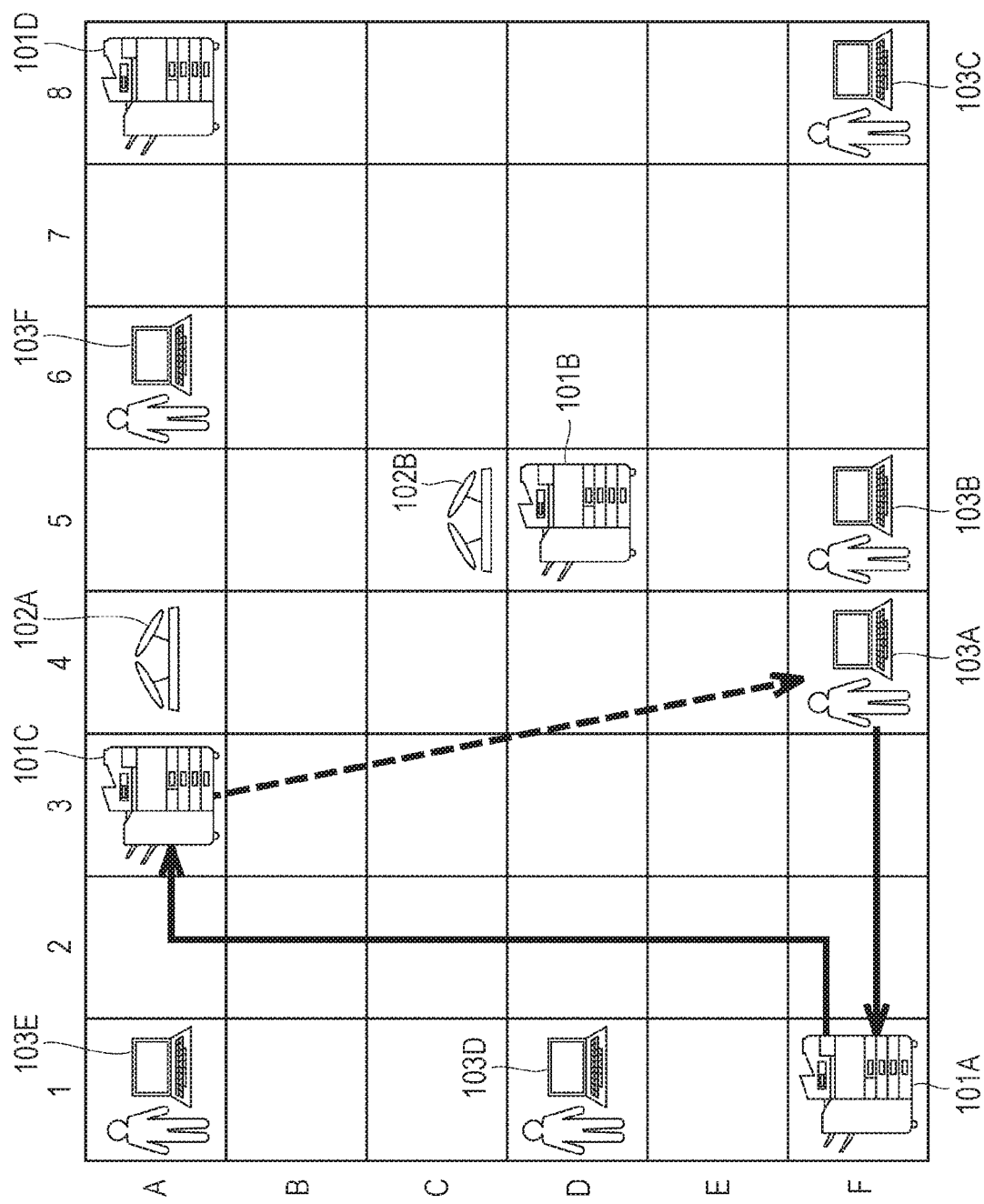
FIG. 3 is a diagram illustrating exemplary operation of a system according to an embodiment in an office.

FIG. 3 is a diagram illustrating exemplary operation of the system according to an embodiment in an office. With reference to FIG. 3, an operation outline of the system in FIG. 2 will be described. As illustrated in FIG. 3, the office is divided into certain sections, and the image forming apparatus 101, the flying vehicle 102, and the terminal device 103 can be arranged in any section. Although vertical and horizontal lengths of respective sections are the same, those lengths may be different in another aspect.

As an example, the following descriptions will be given on the assumption that the image forming apparatus 101A described with reference to FIG. 2 is located at "1-F" in the office. Similarly, the image forming apparatus 101B is located at "5-D" in the office. The image forming apparatus 101C is located at "3-A" in the office. The flying vehicle 102A is located at "4-A" in the office. The flying vehicle 102B is located at "5-C" in the office. The terminal device 103A is located at "4-F" in the office.

A beacon may be installed in each section of the office. The flying vehicle 102 may be able to know in which section the vehicle itself is currently located on a real-time basis by communicating with those beacons. Alternatively, each of the image forming apparatuses 101 in the office may have a wireless communication function. In that case, the flying vehicle 102 estimates the current position from the wireless communication strength with each of the image forming apparatuses 101. Furthermore, a wireless communication device for knowing the position of the flying vehicle 102 may be arranged not only on the image forming apparatus 101 but also at any position in the office.

First, a staff member transmits, using the terminal device 103A, a print job including a "delivery request" to the image forming apparatus 101A. On the basis of the "delivery request", the image forming apparatus 101A obtains a "status", "destination", and "current position" of all the flying vehicles 102 in the office. The "status" includes two types, which are "during delivery" indicating that the flying vehicle 102 is delivering printed material, and "free" indicating a status where no material is being delivered. The image forming apparatus 101A obtains the "destination" or "positional information" of the flying vehicle 102 with the "status" of "free". In this case, it is assumed that the flying vehicle 102A is selected.

Next, the image forming apparatus 101A reads out functional information including the positional information and the print speed of all the image forming apparatuses 101 stored in advance and the positional information of the seat at which the terminal device 103A is located, and calculates a route that minimizes the delivery time at the time when the flying vehicle 102 collects printed material and delivers it to the terminal device 103A. For example, it is assumed that the delivery time in the case where the flying vehicle 102B heads to the terminal device 103A via the image forming apparatus 101B is 30 seconds. Meanwhile, it is assumed that the delivery time in the case where the flying vehicle 102A heads to the terminal device 103A via the image forming apparatus 101C is 25 seconds. In this case, the image forming apparatus 101A selects a combination (image forming apparatus 101C and flying vehicle 102A) that minimizes the delivery time.

Next, the image forming apparatus 101A transfers the print job to the image forming apparatus 101C on the route that minimizes the delivery time. The image forming apparatus 101C prints the received print job. The flying vehicle 102A receives transfer information of the print job from the image forming apparatus 101A or the image forming apparatus 101C. The flying vehicle 102A may heads to the image forming apparatus 101C before or during printing performed by the image forming apparatus 101C to collect and deliver printed material to the seat at which the terminal device 103A is located. After delivering the printed material, the flying vehicle 102A may return to the image forming apparatus 101C that has been passed most recently, or to another image forming apparatus most frequently passed, unless a delivery instruction is received.

In one aspect, the current position of the flying vehicle 102 may be expressed by, instead of lattice sections, a distance from each of the image forming apparatuses 101 to the flying vehicle 102, or may be expressed by coordinates viewed from an optional point.

The system according to the present embodiment transfers a print job to an appropriate image forming apparatus 101 by, for example, knowing a position of each device for each area of the sections divided in a lattice pattern, thereby enabling quick delivery of printed material by the flying vehicle 102.

B. Hardware Configuration of Each Device

Next, a hardware configuration of each device included in the system according to the present embodiment will be described.

Figure 4:
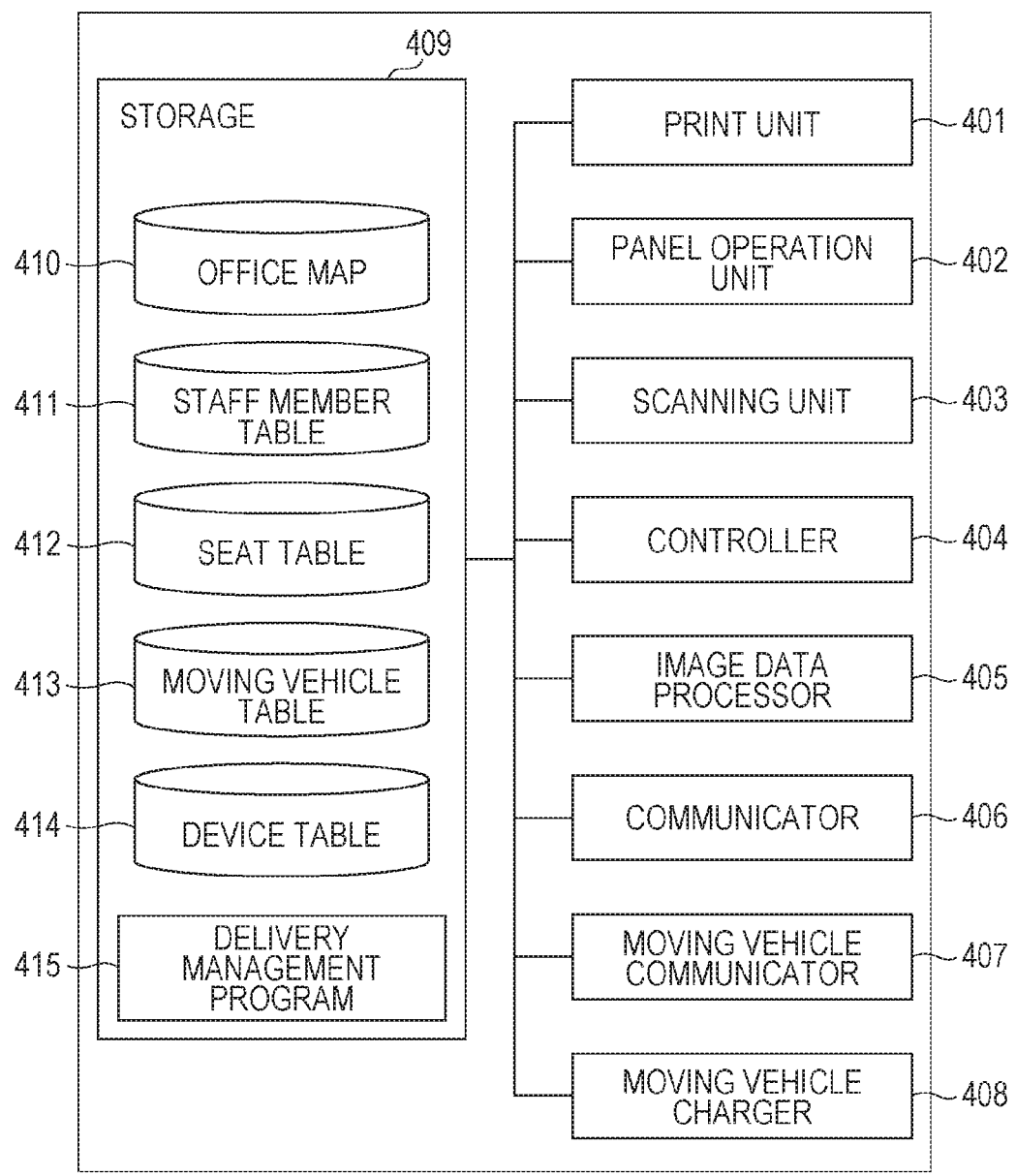
FIG. 4 is a diagram illustrating an exemplary hardware configuration of an image forming apparatus.

FIG. 4 is a diagram illustrating an exemplary hardware configuration of the image forming apparatus 101. With reference to FIG. 4, the image forming apparatus 101 includes a print unit 401, a panel operation unit 402, a scanning unit 403, a controller 404, an image data processor 405, a communicator 406, a moving vehicle communicator 407, a moving vehicle charger 408, and a storage 409. The storage 409 includes an office map 410, a staff member table 411, a seat table 412, a moving vehicle table 413, a device table 414, and a delivery management program 415.

The print unit 401 performs printing on a paper medium or the like on the basis of a print job or the like. The panel operation unit 402 is a user interface for a user to perform operation of the image forming apparatus 101, such as scanning and copying. The scanning unit 403 scans a paper medium or the like and captures it as data.

The controller 404 controls the entire image forming apparatus 101. In one aspect, the controller 404 may be a central processing unit (CPU), and may execute a program by referring to various kinds of data in the storage 409. In another aspect, the controller 404 may be partly implemented by a field programmable gate array (FPGA) or other circuit elements configured to execute a specific process.

The image data processor 405 processes scanned image data and received image data. The communicator 406 communicates with an external communication device. A local area network (LAN) port, a Wi-Fi (registered trademark) transmitter/receiver, or the like may be used as the communicator 406 in one aspect.

The moving vehicle communicator 407 wirelessly communicates with the flying vehicle 102, and exchanges data. The wireless communication strength between the moving vehicle communicator 407 and the flying vehicle 102 can be used for estimating a position of the flying vehicle 102. In addition, the moving vehicle communicator 407 may be included in the communicator 406.

The moving vehicle charger 408 charges the flying vehicle 102. The moving vehicle charger 408 may also serve as a landing stand for the flying vehicle 102. A wireless power supply module may be used as a part of the moving vehicle charger 408 in one aspect.

The storage 409 stores various kinds of data used in the system according to the present embodiment. Details of each table will be described later. In one aspect, the office map 410, the staff member table 411, the seat table 412, the moving vehicle table 413, and the device table 414 may be relational data base tables, and those tables may be referenced by the controller 404.

The delivery management program 415 is software for performing processing of the system according to the present embodiment, which is executed by the controller 404. For example, the controller 404 may execute the process described with reference to FIG. 3 or the like by referring to various tables in the storage 409 and executing the delivery management program 415.

Figure 5:
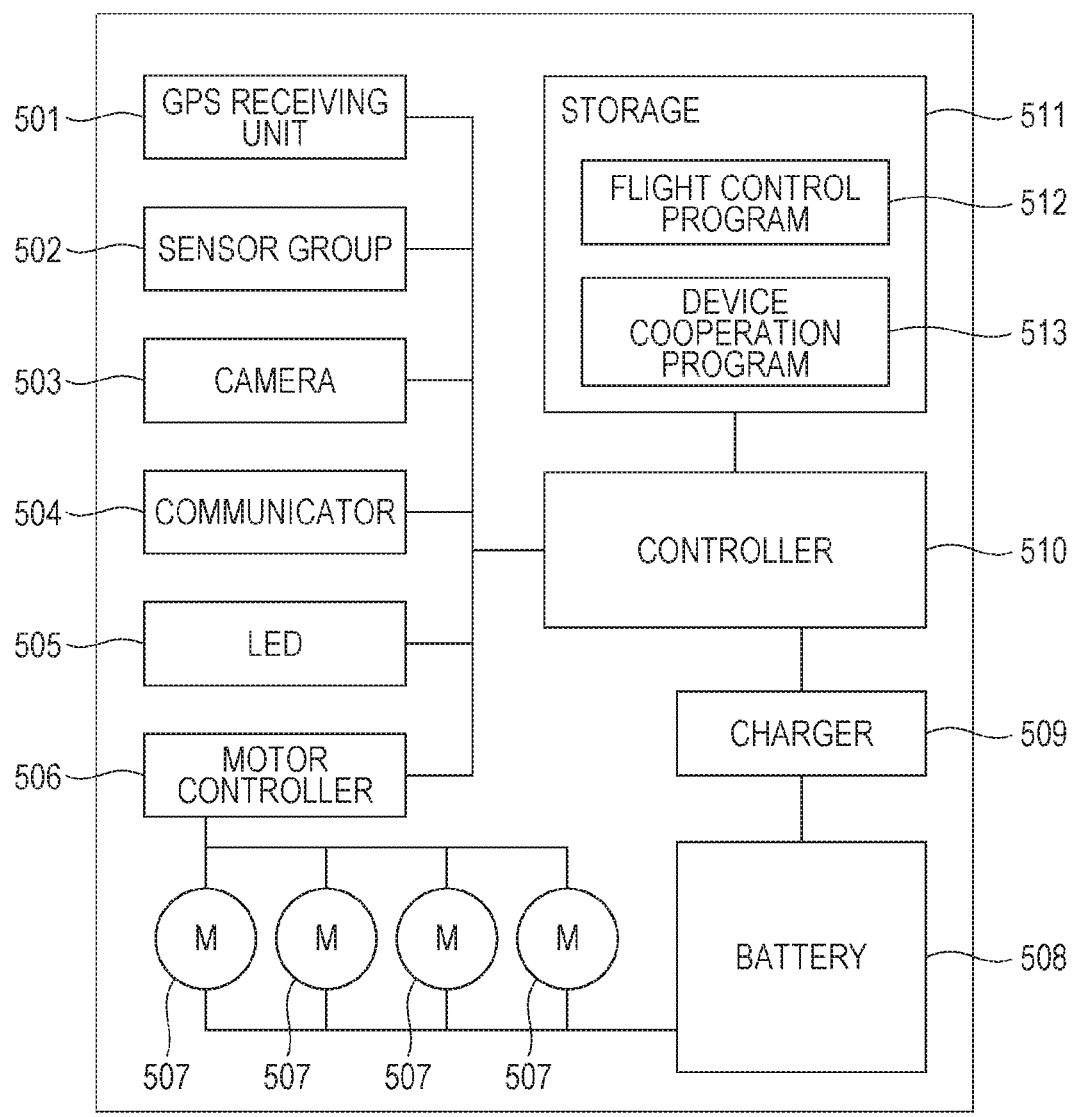
FIG. 5 is a diagram illustrating an exemplary hardware configuration of a flying vehicle.

FIG. 5 is a diagram illustrating an exemplary hardware configuration of the flying vehicle 102. With reference to FIG. 5, the flying vehicle 102 includes a global positioning system (GPS) receiving unit 501, a sensor group 502, a camera 503, a communicator 504, a light emitting diode (LED) 505, a motor controller 506, motors 507, a battery 508, a charger 509, a controller 510, and a storage 511. The storage 511 includes a flight control program 512, and a device cooperation program 513.

The GPS receiving unit 501 generally measures a latitude, longitude, and altitude of the flying vehicle 102 by receiving positioning signals transmitted from four or more GPS satellites. However, the system according to the present embodiment is used indoors, and the positioning signals from each GPS satellite cannot be received in many cases except at the window. In view of the above, it is preferable that a transmitter that transmits pseudo positioning signals having the configuration same as the configuration of the positioning signals is installed on the ceiling of the place where the system is installed. In that case, the pseudo positioning signals can include positional information indicating a location at which the transmitter is installed.

The sensor group 502 includes a gyro sensor, an acceleration sensor, a compass sensor, and the like. The sensor group 502 is mainly used for flight control. Further, the sensor group 502 may include an infrared sensor, an ultrasonic sensor, or the like for safety measures such as collision avoidance.

The camera 503 obtains an image of the surroundings of the flying vehicle 102 during the flight. The camera 503 may be used to recognize a person or the image forming apparatus 101. The communicator 504 communicates with the image forming apparatus 101 and the wireless device 104. It may have a function of communicating with a beacon in the office. The LED 505 is lit to notify a person in the office of the presence and the traveling direction of the flying vehicle 102.

The motor controller 506 controls the rotating speed of the motors 507. The motors 507 cause the flying vehicle 102 to float in the air by rotating propellers. The battery 508 supplies power to each component of the flying vehicle 102. A lithium-ion secondary battery may be used as the battery 508 in one aspect. The charger 509 charges the battery 508. A wireless power supply module may be used as the charger 509 in one aspect. In that case, the charger 509 can receive power from the moving vehicle charger 408 of the image forming apparatus 101 in a non-contact manner.

The controller 510 controls the entire flying vehicle 102. The controller 510 can be implemented by, for example, a CPU in one aspect. In that case, the controller 510 refers to various kinds of data in the storage 511, and executes a program. In another aspect, a part of or all of the controller 510 may be a combination of circuit elements configured to execute a specific process. The storage 511 stores various programs to be used in the system according to the present embodiment. The flight control program 512 is software for controlling the flight of the flying vehicle 102, which causes the flying vehicle 102 to fly by controlling, on the basis of input values of the sensor group, the rotating speed of the motors 507 via the motor controller 506. The device cooperation program 513 transmits/receives positional information, destination information, information regarding print job transfer destination, and the like to/from the image forming apparatus 101, and collects and delivers printed material. The flight control program 512 and the device cooperation program 513 are executed by the controller 510.

Figures 6, 7:
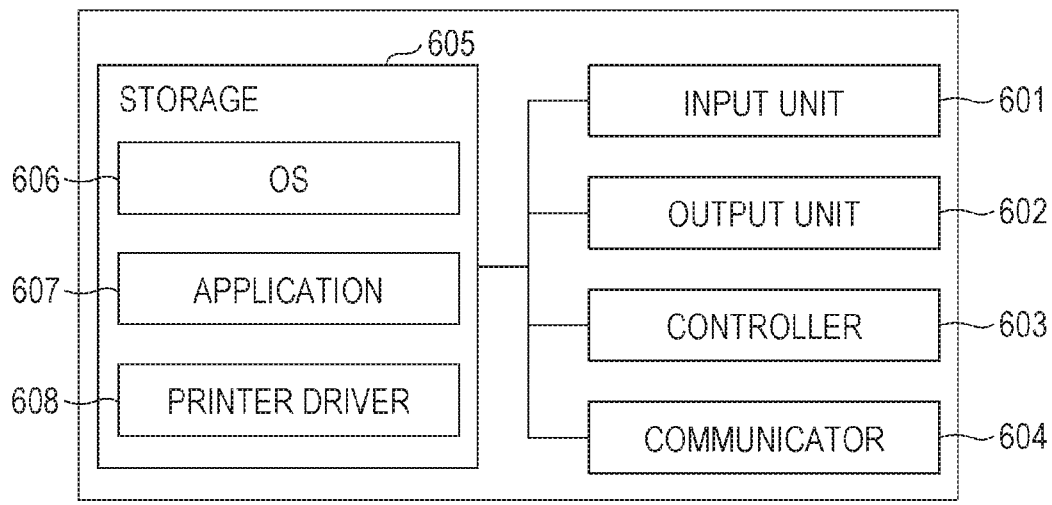
FIG. 6 is a diagram illustrating an exemplary hardware configuration of a terminal device.
FIG. 7 is a table illustrating an exemplary office map.

FIG. 6 is a diagram illustrating an exemplary hardware configuration of the terminal device 103. With reference to FIG. 6, the terminal device 103 includes an input unit 601, an output unit 602, a controller 603, a communicator 604, and a storage 605. The storage 605 includes an operating system (OS) 606, an application 607, and a printer driver 608.

The input unit 601 is used for connecting a keyboard, a mouse, and the like. A universal serial bus (USB) interface may be used as the input unit 601 in one aspect. The output unit 602 may be used for connecting an output device, such as a display. A high-definition multimedia interface (HDMI) (registered trademark) or a digital visual interface (DVI) may be used as the output unit 602 in one aspect.

The controller 603 controls the entire terminal device 103. The controller 603 is implemented by a CPU in one aspect. In that case, the CPU refers to various kinds of data in the storage 605, and executes a program. In another aspect, a part of or all of the controller 603 may be a combination of circuit elements configured to execute a specific process. The communicator 604 is used to communicate with an external communication device. A local area network (LAN) port, a Wi-Fi (registered trademark) transmitter/receiver, or the like may be used as the communicator 604 in one aspect.

The storage 605 stores various programs to be used in the system according to the present embodiment. The OS 606 execute the application 607 on the terminal device 103. The application 607 is software installed in the terminal device 103, which is, for example, text creating software. The printer driver 608 communicates with the image forming apparatus 101.

C. Various Database Tables

Next, various tables included in the storage 409 of the image forming apparatus 101 according to the present embodiment will be described. Note that not all the image forming apparatuses 101 need to have various tables included in the storage 409, and it is sufficient if one image forming apparatus 101 has various tables. In that case, the other image forming apparatuses 101 may inquire of the image forming apparatus 101 having various tables for information as needed.

FIG. 7 is a table illustrating an example of the office map 410. The office map 410 divides the office into certain sections, and manages positional information of each section. The office map 410 is used to calculate a distance between devices, and to obtain a physical position of the destination of the flying vehicle 102.

With reference to FIG. 7, the office map 410 includes a map identifier 701, coordinates 702, and a physical position 703. The example of FIG. 7 is an office map 410 that manages the office of FIG. 3. The map identifier 701 is an identifier assigned to each section in FIG. 3. The coordinates 702 is logical positional information of each section, which is a position recognized on software. The physical position 703 is actual coordinate information based on an arbitrary point.

For example, the coordinates 702 with the map identifier 701 "M0001" is "1-A". "1-A" indicates a section in which a terminal device 103E is located. The controller 404 of the image forming apparatus 101 can obtain the position of the seat at which the terminal device 103E is located by referring to the physical position 703 of the record with the coordinates 702 of "1-A".

The controller 404 of the image forming apparatus 101 obtains the distance between the coordinates 702 and the flight time at the time of calculating a flight route of the flying vehicle 102. After the flight route of the flying vehicle 102 is determined, the controller 404 of the image forming apparatus 101 may transmit the physical position 703 of the destination to the flying vehicle 102 via the communicator 406.

FIG. 8 is a table illustrating an example of the staff member table 411. The staff member table 411 manages information regarding each staff member in the office. The staff member table 411 can search for the destination of the flying vehicle 102 using a name of the staff member in cooperation with the seat table 412 to be described later. With reference to FIG. 8, the staff member table 411 includes a staff member identifier 801, a name 802, an affiliation 803, and detailed information 804.

The staff member identifier 801 is an identifier assigned to each staff member in the office. The name 802 is a name of each staff member. The name 802 only needs to be able to identify an individual, such as a name, a family name, and a nickname. The affiliation 803 is a group to which each staff member belongs. The affiliation 803 may be, for example, a company department or a project team. The detailed information 804 is detailed information such as contact information of each staff member.

FIG. 9 is a table illustrating an example of the seat table 412. The seat table 412 manages a position of each seat in the office. The seat table 412 is used to specify a delivery destination of printed material.

With reference to FIG. 9, the seat table 412 includes a seat identifier 901, a map identifier 902, and a staff member identifier 903. The seat identifier 901 is an identifier assigned to each seat. The map identifier 902 corresponds to the map identifier 701 of the office map 410. The staff member identifier 903 corresponds to the staff member identifier 801 of the staff member table 411.

For example, the map identifier 902 with the seat identifier 901 of "S0002" is "M0004". Further, the staff member identifier 903 of the record with the map identifier 902 of "M0004" is "E0002".

With reference to FIG. 7, the coordinates 702 with the map identifier 701 of "M0004" is "1-D". Similarly, with reference to FIG. 8, the name 802 with the staff member identifier 801 of "E0002" is "Kato". Therefore, it can be understood that the staff member "Kato" is in the seat of the office section "1-D" in FIG. 3.

As described above, with the office map 410, the staff member table 411, and the seat table 412 being in cooperation with each other, the controller 404 of the image forming apparatus 101 can conduct a search regarding who is in which seat, and can designate the destination of the flying vehicle 102 using a staff member name.

FIG. 10 is a table illustrating an example of the moving vehicle table 413. The moving vehicle table 413 manages the current location and status of the flying vehicle 102 in the office. The moving vehicle table 413 is used to select the flying vehicle 102 for delivering printed material, for example.

With reference to FIG. 10, the moving vehicle table 413 includes a moving vehicle identifier 1001, an internet protocol (IP) address 1002, a flight speed 1003, a current position 1004, a destination 1005, a status 1006, and a remaining battery level 1007.

The moving vehicle identifier 1001 is an identifier assigned to the flying vehicle 102. The IP address 1002 is an IP address assigned to the flying vehicle 102. The image forming apparatus 101 communicates with each flying vehicle 102 using the IP address 1002. In one aspect, an IP address may be assigned to each flying vehicle 102 by the image forming apparatus 101 or the wireless device 104.

The flight speed 1003 is a moving speed of the flying vehicle 102. The flight speed 1003 is used to calculate a travel time of the flying vehicle 102 to the destination. The current position 1004 is positional information of the flying vehicle 102, which corresponds to the map identifier of FIG. 7. The destination 1005 is a destination to which the flying vehicle 102 is directed, which corresponds to the map identifier of FIG. 7.

The status 1006 indicates whether the flying vehicle 102 is delivering printed material. If the status 1006 is "free", the flying vehicle 102 is not delivering anything. If the status 1006 is "during delivery", the flying vehicle 102 is delivering printed material. The remaining battery level 1007 indicates a remaining capacity of the battery of the flying vehicle 102. A data format of the remaining battery level 1007 may be "%", or "mAh".

Figure 11:
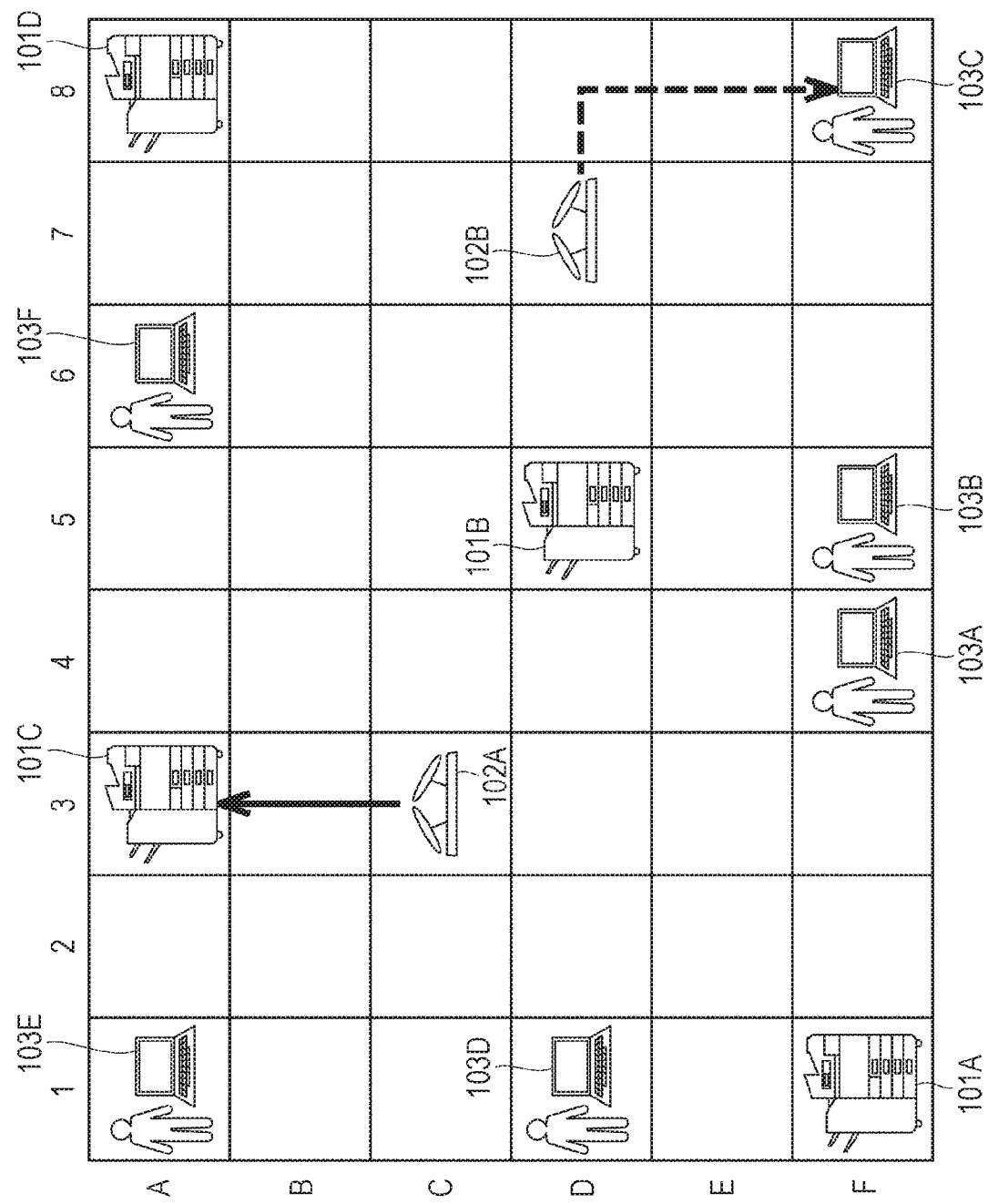
FIG. 11 is a diagram illustrating an exemplary office state corresponding to FIG. 10.

FIG. 11 is a diagram illustrating an exemplary office state corresponding to FIG. 10. As illustrated in FIG. 11, the flying vehicle 102A is an airframe with the moving vehicle identifier 1001="D0001". The flying vehicle 102B is an airframe with the moving vehicle identifier 1001="D0002".

The flying vehicle 102A is flying at the coordinates of "3-C" (current position 1004="M0015") in the office. Further, the flying vehicle 102A is heading to the coordinates of "3-A" (current position 1004="M0013") in the office. The flying vehicle 102A is not delivering printed material (status 1006="free"), and can newly receive a delivery command from the image forming apparatus 101. Further, the flying vehicle 102A has a sufficient remaining battery level (remaining battery level 1007="78").

The flying vehicle 102B is flying at the coordinates of "7-D" (current position 1004="M0040") in the office. Further, the flying vehicle 102B is heading to the coordinates of "8-F" (current position 1004="M0048") in the office. The flying vehicle 102B is delivering printed material (status 1006="during delivery"), and cannot newly receive a delivery command from the image forming apparatus 101. Further, the flying vehicle 102B has a low remaining battery level (remaining battery level 1007="38"). The image forming apparatus 101 can know statuses of all the flying vehicles 102 in the office by periodically communicating with the flying vehicles 102 and updating the moving vehicle table 413.

FIG. 12 is a table illustrating an example of the device table 414. The device table 414 manages a position and a status of the image forming apparatus 101 in the office. The device table 414 is used to select the image forming apparatus 101 to be a transfer destination of a print job.

With reference to FIG. 12, the device table 414 includes a device identifier 1201, a position 1202, a print speed 1203, a function 1204, a status 1205, and a moving vehicle set flag 1206. The device identifier 1201 is an identifier assigned to the image forming apparatus 101. The position 1202 indicates a position of the image forming apparatus 101 in the office, and corresponds to the map identifier 701 of FIG. 7.

The print speed 1023 represents printing performance of the image forming apparatus. The print speed 1023 is used to estimate the time at which a print job is complete. The print speed 1023 may include not only a speed of printing but also a speed of each function such as stapling.

The function 1204 represents a function and performance of the image forming apparatus 101. For example, the function 1204 may include the print speed of the image forming apparatus 101, the presence/absence of a stapling function, a print speed, and the like. The status 1205 indicates the current status of the image forming apparatus 101. For example, the status 1205 may include information indicating whether or not the image forming apparatus 101 is performing printing, information indicating an error status of the image forming apparatus 101, and the like. The image forming apparatus 101 can search for, for example, another image forming apparatus 101 that has a function of executing a print job and in a standby state by referring to the function 1204 and the status 1205.

The moving vehicle set flag 1206 indicates whether or not the flying vehicle 102 has landed or is hovering on the image forming apparatus 101. If the moving vehicle set flag 1206 is "0", the flying vehicle 102 is not located on the image forming apparatus 101. If the moving vehicle set flag 1206 is "1", the flying vehicle 102 is located on the image forming apparatus 101. The image forming apparatus 101 can select the image forming apparatus 101 having the shortest distance from the flying vehicle 102 by referring to the moving vehicle set flag 1206.

Figure 13:
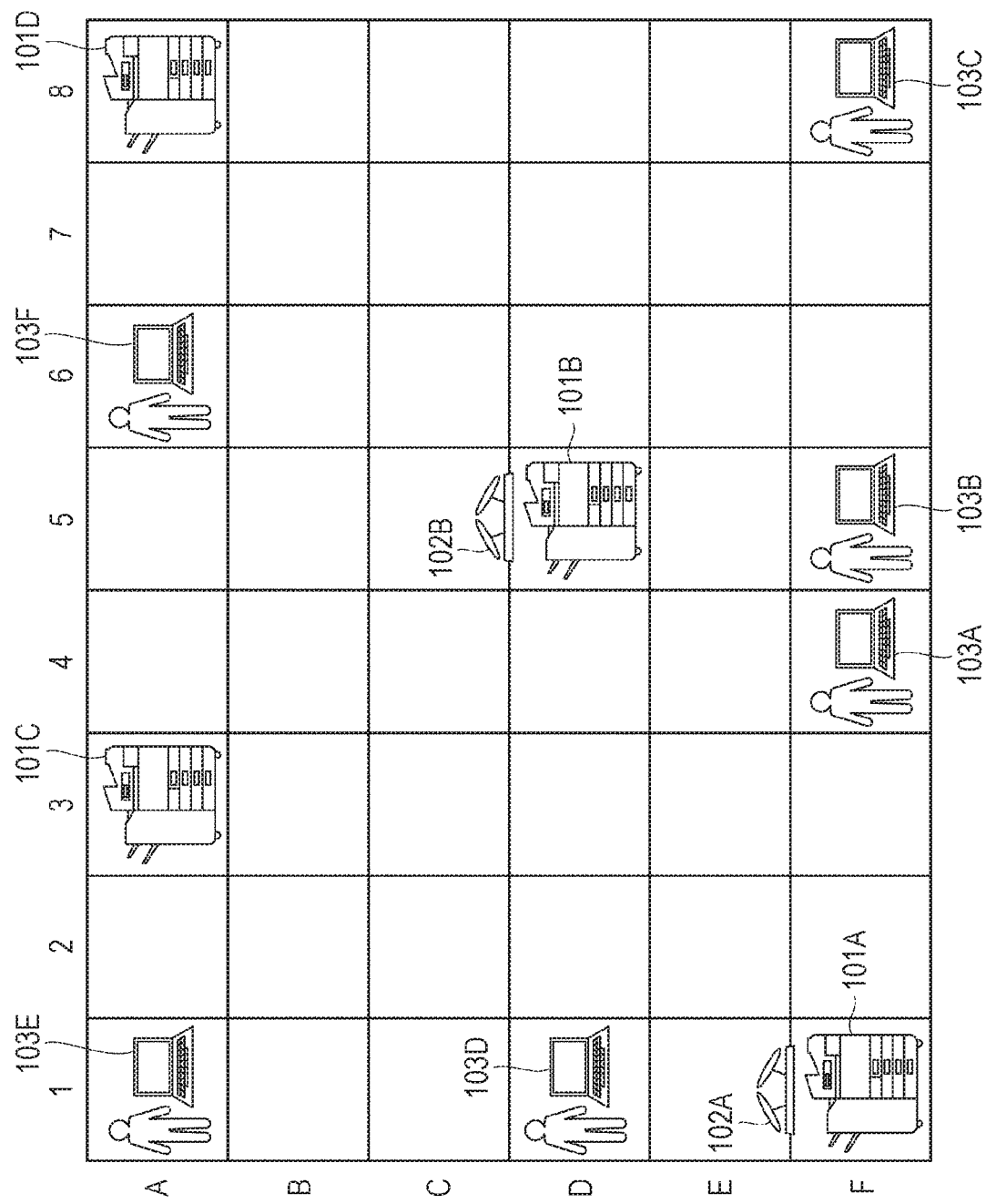
FIG. 13 is a diagram illustrating an exemplary office state corresponding to FIG. 12.

FIG. 13 is a diagram illustrating an exemplary office state corresponding to FIG. 12. The value of the device identifier 1201 of the image forming apparatus 101A is "P0001". The value of the device identifier 1201 of the image forming apparatus 101C is "P0002".

The image forming apparatus 101A is located at the coordinates of "1-F" (position 1202="M0006") in the office. The image forming apparatus 101A is performing printing (status 1205="printing"), and cannot immediately execute the next print job. Further, the flying vehicle 102A is located on the image forming apparatus 101A (moving vehicle set flag 1206="1").

The image forming apparatus 101C is located at the coordinates of "3-A" (position 1202="M0013") in the office. The image forming apparatus 101C is in a standby state (status 1205="standby"), and can immediately execute the next print job. Further, the flying vehicle 102A is not located on the image forming apparatus 101C (moving vehicle set flag 1206="0"). A certain image forming apparatus 101 can know the statuses of all the image forming apparatuses 101 in the office by periodically communicating with other image forming apparatuses 101 and updating the device table 414.

D. System Control Structure

Figure 14:
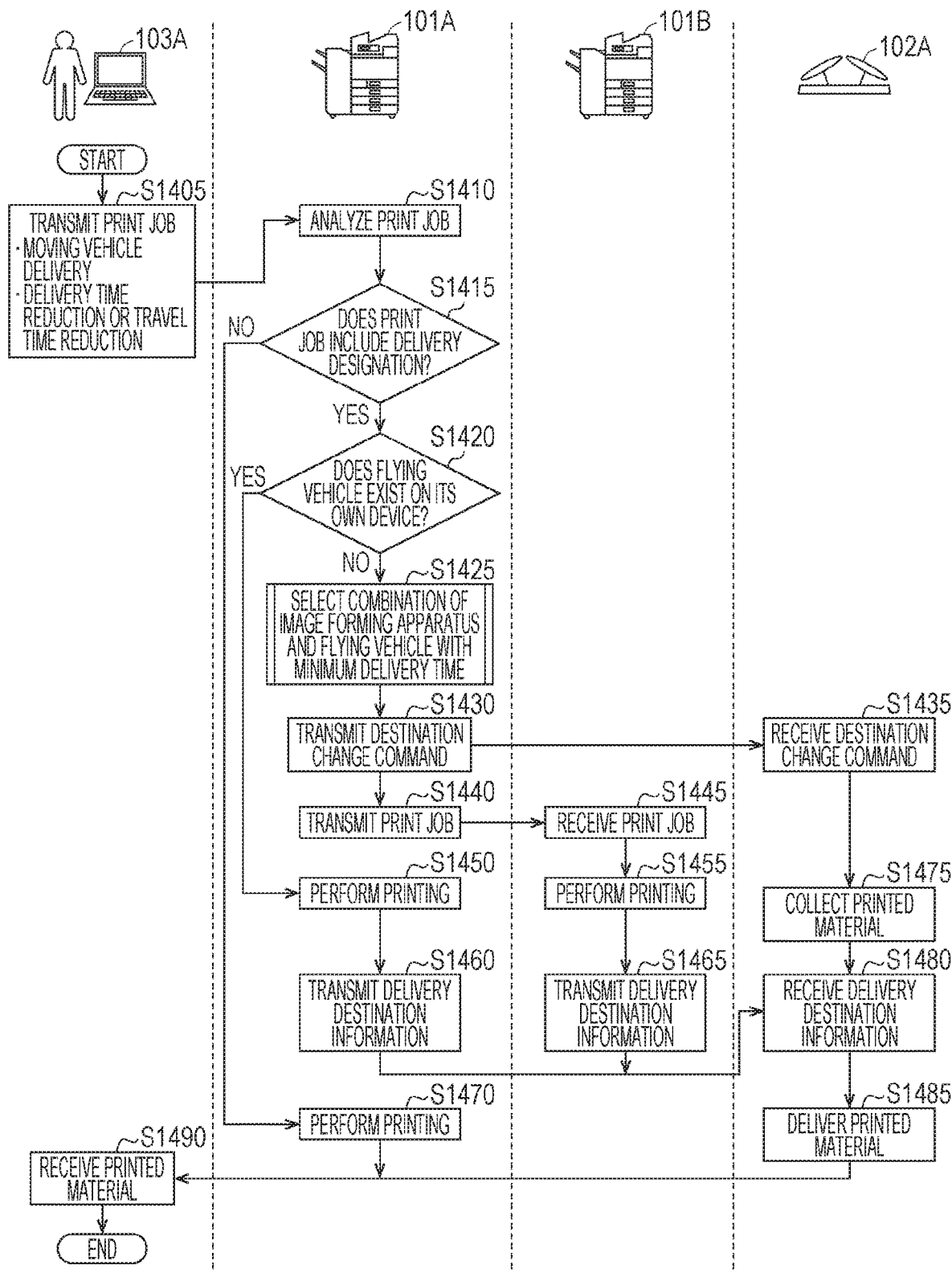
FIG. 14 is an exemplary flowchart of a system according to an embodiment.

FIG. 14 is an exemplary flowchart of the system according to the present embodiment. With reference to FIG. 14, a control structure of the system according to the present embodiment will be described.

In step S1405, the controller 603 of the terminal device 103A transmits a print job to the prescribed image forming apparatus 101A via the communicator 604. As illustrated in FIG. 14, the print job is described in PJL, and an instruction on delivery to the seat of a staff member as a user using the flying vehicle 102 is also described in PJL. Note that the delivery destination described in the PJL may be other than the user's seat, and the delivery destination may be specified by the staff member name. The delivery instruction may include an instruction that prioritizes reduction of the delivery time, and may include an instruction that prioritizes reduction of the delivery distance to suppress battery consumption of the flying vehicle 102.

In step S1410, the controller 404 of the image forming apparatus 101A analyzes the print job received from the terminal device 103A. In step S1415, the controller 404 of the image forming apparatus 101A determines whether or not the print job includes delivery designation. If the controller 404 of the image forming apparatus 101A determines that the print job includes the delivery designation (YES in step S1415), the control proceeds to step S1420. If the controller 404 of the image forming apparatus 101A determines that the print job does not include the delivery designation (NO in step S1415), the control proceeds to step S1470. In step S1470, the image forming apparatus 101A performs printing (executes the print job). Since the print job does not include the delivery designation, the flying vehicle 102 does not collect printed material.

In step S1420, the image forming apparatus 101A determines whether or not the flying vehicle 102 is located on its own apparatus. Alternatively, the image forming apparatus 101A determines whether or not there is a flying vehicle 102 heading toward its own apparatus as a destination. If there is the flying vehicle 102 on the image forming apparatus 101A (YES in step S1420), the controller 404 of the image forming apparatus 101A advances the control to step S1450. If there is no flying vehicle 102 on the image forming apparatus 101A (NO in step S1420), the controller 404 of the image forming apparatus 101A advances the control to step S1425.

In step S1425, the controller 404 of the image forming apparatus 101A calculates a combination of the image forming apparatus 101 and the flying vehicle 102 in such a manner that the delivery time is minimized Detailed contents of the process will be described later. In a case where the delivery instruction includes an instruction that prioritizes reduction of the delivery distance, the controller 404 of the image forming apparatus 101A may select a combination of the image forming apparatus 101 and the flying vehicle 102 in such a manner that the delivery distance of the flying vehicle 102 is minimized Hereinafter, an exemplary case where the controller 404 of the image forming apparatus 101A selects the image forming apparatus 101B and the flying vehicle 102A will be described.

In step S1430, the controller 404 of the image forming apparatus 101A transmits a destination change command to the flying vehicle 102A selected in step S1425 via the communicator 406. In step S1435, the flying vehicle 102A refers to the received destination change command, and heads to the image forming apparatus 101B that is a new destination. In step S1440, the controller 404 of the image forming apparatus 101A transfers the print job to the image forming apparatus 101B via the communicator 406.

In step S1445, the controller 404 of the image forming apparatus 101B receives the print job from the image forming apparatus 101A via the communicator 406. In step S1455, the controller 404 of the image forming apparatus 101B causes the print unit 401 to execute the print job.

In step S1450, the controller 404 of the image forming apparatus 101A causes the print unit 401 to execute the print job. The image forming apparatus 101A is the prescribed image forming apparatus 101 of the terminal device 103A, and is the closest to the terminal device 103A. Therefore, if there is the flying vehicle 102 on the image forming apparatus 101A, the delivery time can be minimized by the flying vehicle 102 being caused to deliver printed material to the seat at which the terminal device 103A is located.

In step S1460, the image forming apparatus 101A transmits delivery destination information to the flying vehicle 102A via the communicator 406. In step S1465, the image forming apparatus 101B transmits delivery destination information to the flying vehicle 102A via the communicator 406. In a similar manner to step S1465, the image forming apparatus 101 that has executed the print job may transmit delivery destination information to the flying vehicle 102A. Further, the image forming apparatus 101A may transmit the delivery destination information to the flying vehicle 102A even in a case where the image forming apparatus 101B has executed the print job.

In step S1475, the flying vehicle 102A collects the printed material from the image forming apparatus 101 that executes the print job. The flying vehicle 102A may head to the image forming apparatus 101 before the processing of steps S1450 and S1455 is complete.

In step S1480, the flying vehicle 102A receives the delivery destination information via the communicator 504. Note that the flying vehicle 102A may receive the delivery destination information before the processing of step S1475.

In step S1485, the flying vehicle 102A collects the printed material from the image forming apparatus 101A or from the image forming apparatus 101B. Further, the flying vehicle 102A refers to the delivery destination information, and delivers the printed material to the "seat at which the terminal device 103A is located" that is the delivery destination.

In step S1490, the printed material is delivered to, by the flying vehicle 102A, the seat at which the terminal device 103A is located. After detecting that the user has collected the printed material, the flying vehicle 102A may head to another image forming apparatus 101 to collect other printed material.

Figure 15:
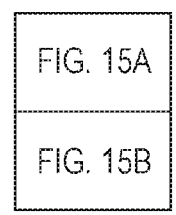
FIGS. 15A and 15B are an exemplary flowchart of delivery time calculation.
Figure 15:
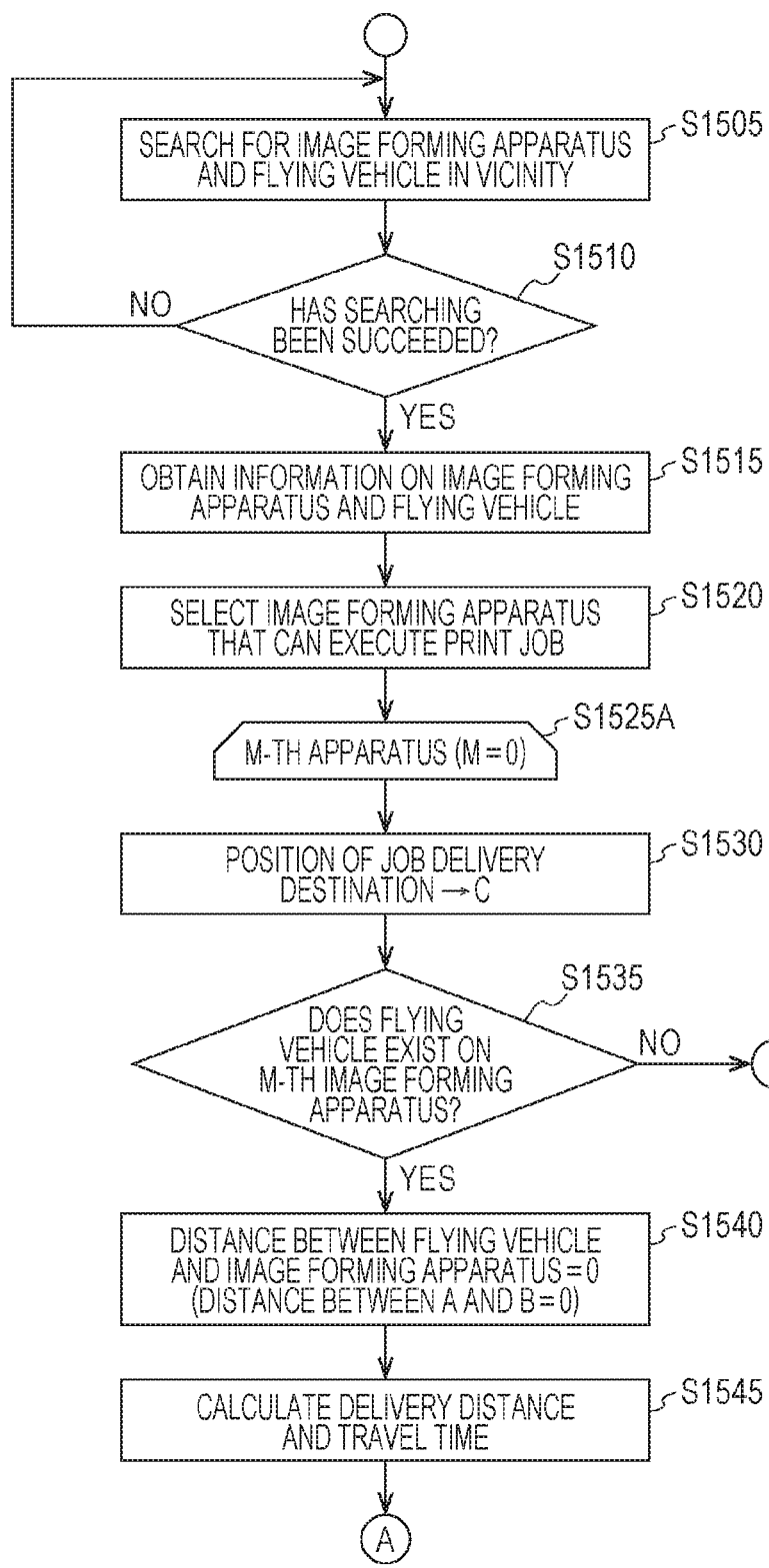
Figure 15B:
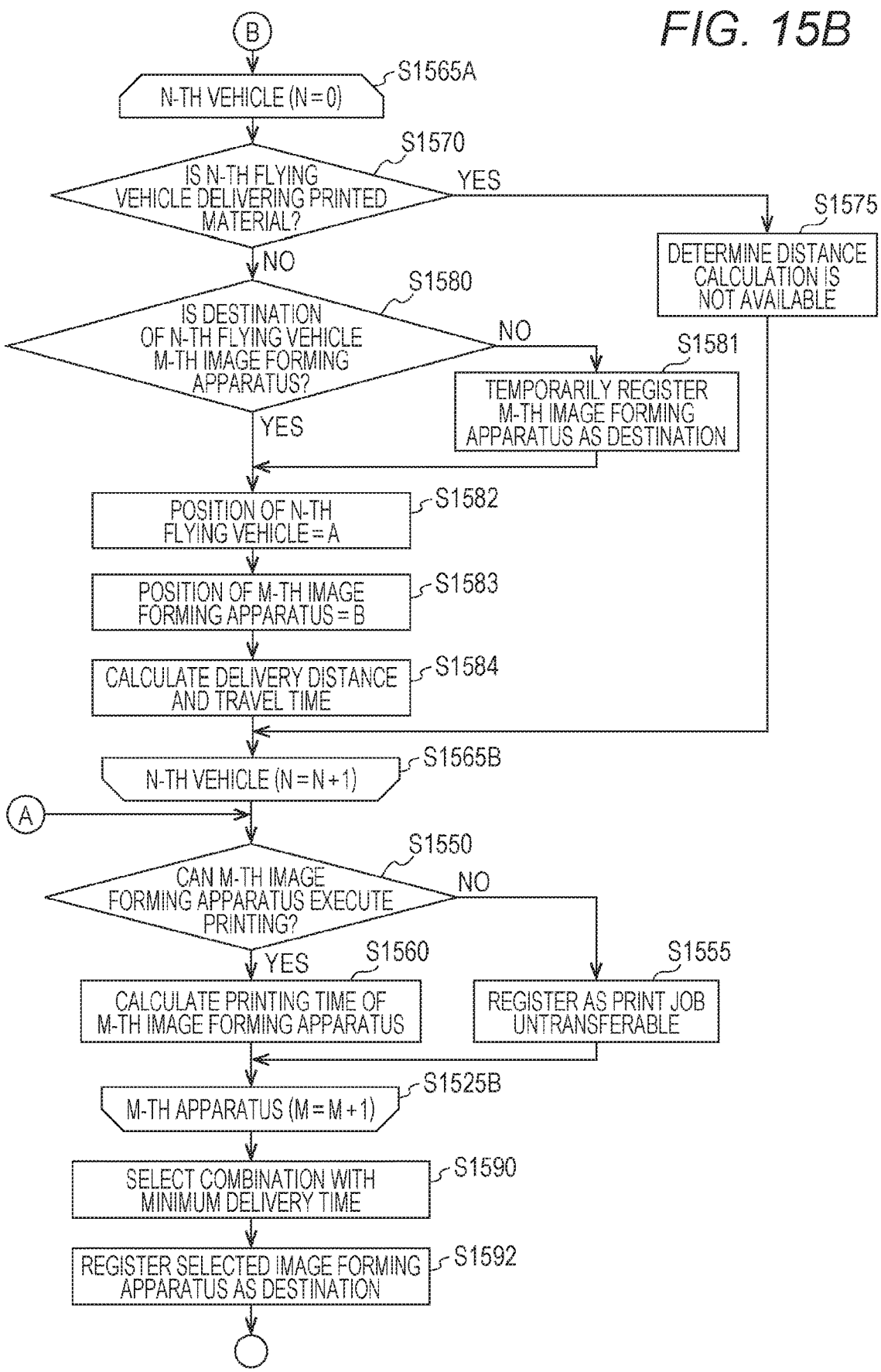

FIGS. 15A and 15B are an exemplary flowchart of delivery time calculation. With reference to FIGS. 15A and 15B, a detailed process of step S1425 in FIG. 14 will be described. In the flow of FIGS. 15A and 15B, in a case where the position of the flying vehicle 102 that delivers the printed material is "A", the position of the image forming apparatus 101 that executes the print job is "B", and the seat position of the terminal device 103A as the delivery destination is "C", the controller 404 of the image forming apparatus 101A calculates a "distance between A and B+distance between B and C" as a delivery distance of the flying vehicle 102.

In step S1505, the controller 404 of the image forming apparatus 101A searches for another image forming apparatus 101 and the flying vehicle 102 existing in the vicinity (in the office, etc.). The controller 404 of the image forming apparatus 101A may execute the processing of step S1505 at a timing when the print job is received, or may execute it periodically. Further, the controller 404 of the image forming apparatus 101A may refer to the moving vehicle table 413 and the device table 414 in the storage 409, and may transmit existence confirmation signals to another image forming apparatus 101 and the flying vehicle 102 via the communicator 406.

In step S1510, the controller 404 of the image forming apparatus 101A determines whether or not the searching of another image forming apparatus 101 and the flying vehicle 102 has been succeeded. If the controller 404 of the image forming apparatus 101A has failed in searching of another image forming apparatus 101 and the flying vehicle 102 (NO in step S1510), the controller 404 of the image forming apparatus 101A advances the control to step S1505. If the controller 404 of the image forming apparatus 101A has succeeded in searching of another image forming apparatus 101 and the flying vehicle 102 (YES in step S1510), the controller 404 of the image forming apparatus 101A advances the control to step S1515.

In step S1515, the controller 404 of the image forming apparatus 101A obtains information regarding the other image forming apparatus 101 and the flying vehicle 102 searched in step S1505, and updates the moving vehicle table 413 and the device table 414.

In step S1520, the controller 404 of the image forming apparatus 101A refers to the print setting of the print job and the device table 414, and selects an image forming apparatus 101 that can perform printing with the specified print setting. The controller 404 of the image forming apparatus 101A executes the process in the loop of steps S1525A to S1525B for each image forming apparatus 101 selected in step S1520. The subsequent process will be described using the M-th image forming apparatus 101 (M-th loop) as an example.

In step S1530, the controller 404 of the image forming apparatus 101A refers to the print job and the seat table 412, and obtains the seat position "C" of the terminal device 103A that is the delivery destination of the printed material.

In step S1535, the controller 404 of the image forming apparatus 101A confirms whether or not the flying vehicle 102 is located on the M-th image forming apparatus 101. If the controller 404 of the image forming apparatus 101A determines that the flying vehicle 102 is located on the M-th image forming apparatus 101 (YES in step S1535), the control proceeds to step S1540. If the controller 404 of the image forming apparatus 101A determines that the flying vehicle 102 is not located on the M-th image forming apparatus 101 (NO in step S1535), the control proceeds to step S1565A.

In step S1540, the controller 404 of the image forming apparatus 101A sets the distance of "distance between A and B" between the image forming apparatus 101 and the flying vehicle 102A to "0". In step S1545, the controller 404 of the image forming apparatus 101A calculates a "delivery distance of the flying vehicle 102". Since the distance between the image forming apparatus 101 and the flying vehicle 102 is "distance between A and B=0", it can be understood that the delivery distance of the flying vehicle 102 is the distance between the image forming apparatus 101 and the seat position of the terminal device 103A, which is "distance between B and C". In step S1545, the controller 404 of the image forming apparatus 101A calculates a delivery distance and a travel time in the case where the flying vehicle 102 delivers the printed material from the M-th image forming apparatus 101. Note that the image forming apparatus 101A refers to the flight speed 1003 of the moving vehicle table 413, and calculates the travel time.

The controller 404 of the image forming apparatus 101A executes the process in the loop of steps S1565A to S1565B for each flying vehicle 102 selected in step S1520. The subsequent process will be described using an N-th flying vehicle 102 (N-th loop) as an example.

In step S1570, the controller 404 of the image forming apparatus 101A refers to the moving vehicle table 413, and determines whether or not the N-th flying vehicle 102 is delivering printed material. If the controller 404 of the image forming apparatus 101A determines that the N-th flying vehicle 102 is delivering printed material (YES in step S1570), the control proceeds to step S1580. If the controller 404 of the image forming apparatus 101A determines that the N-th flying vehicle 102 is not delivering printed material (NO in step S1570), the control proceeds to step S1575. In step S1575, the controller 404 of the image forming apparatus 101A determines that the N-th flying vehicle 102 cannot be used for the current printed material delivery, and the control proceeds to step S1565B.

In step S1580, the controller 404 of the image forming apparatus 101A refers to the moving vehicle table 413, and determines whether or not the destination of the N-th flying vehicle 102 is the M-th image forming apparatus 101. If the controller 404 of the image forming apparatus 101A determines that the destination of the N-th flying vehicle 102 is the M-th image forming apparatus 101 (YES in step S1580), the control proceeds to step S1582. If the controller 404 of the image forming apparatus 101A determines that the destination of the N-th flying vehicle 102 is not the M-th image forming apparatus 101 (NO in step S1580), the control proceeds to step S1581. In step S1581, the controller 404 of the image forming apparatus 101A temporarily registers the M-th image forming apparatus 101 as a destination of the N-th flying vehicle 102.

In step S1582, the controller 404 of the image forming apparatus 101A refers to the moving vehicle table 413, and obtains the position "A" of the N-th flying vehicle 102. Note that the position "A" of the N-th flying vehicle 102 may be an expected position at the scheduled time when the M-th image forming apparatus 101 completes the print job. In that case, the controller 404 of the image forming apparatus 101A calculates the position "A" of the N-th flying vehicle 102 from the current position of the flying vehicle 102 and the function 1204 of the M-th image forming apparatus 101.

In step S1583, the controller 404 of the image forming apparatus 101A refers to the device table 414, and obtains the position "B" of the M-th image forming apparatus 101. In step S1584, the controller 404 of the image forming apparatus 101A calculates a delivery distance and a travel time in the case where the N-th flying vehicle 102 is caused to deliver the printed material of the M-th image forming apparatus 101. Note that the image forming apparatus 101A refers to the flight speed 1003 of the moving vehicle table 413, and calculates the travel time. After completing the process of the loop of step S1565, the controller 404 of the image forming apparatus 101A advances the control to step S1550.

In step S1550, the image forming apparatus 101A determines whether or not the print job can be executed in the M-th image forming apparatus 101. The image forming apparatus 101A determines whether or not the M-th image forming apparatus 101 can execute the print job by referring to the status 1205 of the device table 414. If the image forming apparatus 101A determines that the M-th image forming apparatus 101 can execute the print job (YES in step S1550), the control proceeds to step S1560. If the image forming apparatus 101A determines that the M-th image forming apparatus 101 cannot execute the print job (NO in step S1550), the control proceeds to step S1555.

In step S1555, the image forming apparatus 101A registers that the print job cannot be transferred to the M-th image forming apparatus 101, and excludes it from the candidates for the transfer destination of the current print job. In step S1560, the image forming apparatus 101A calculates an execution time (printing time) of the print job by the M-th image forming apparatus 101.

After performing the processing of step S1555 or S1560, the controller 404 of the image forming apparatus 101A repeats the process in the loop of steps S1525A to S1525B for an M+1th image forming apparatus 101 again. The controller 404 of the image forming apparatus 101A repeats the process in the loop of steps S1525A to S1525B, thereby calculating the printing time and the travel time for all combinations of the image forming apparatus 101 and the flying vehicle 102.

In step S1590, the controller 404 of the image forming apparatus 101A selects the combination of the image forming apparatus 101 and the flying vehicle 102 that minimizes the delivery time (printing time+travel time) from the calculated result. In step S1592, the image forming apparatus 101A duly registers the image forming apparatus 101 selected in step S1590 as the destination of the flying vehicle 102 selected in step S1590.

Note that the temporary registration in step S1581 is canceled for all the flying vehicles 102 that have not been selected in step S1590. The image forming apparatus 101A may transmit a command to cancel the temporary registration to all the flying vehicles 102 that have not been selected in step S1590. Further, in the case where a formal registration command is not received within a certain period of time after a temporary registration command is received, the flying vehicle 102 may discard the temporary registration command.

As described above with reference to the flows of FIGS. 14 and 15, the image forming apparatuses 101 of the system according to the present embodiment mutually transfer print jobs in advance to minimize the delivery time, whereby the user can receive the printed material without waiting for a long time. In addition, the print job includes the setting that prioritizes reduction of the travel distance of the flying vehicle 102 instead of the setting that prioritizes reduction of the delivery time, whereby the flight distance and the battery consumption of the flying vehicle 102 can be reduced.

E. Application Examples

Next, operation for each case of the system according to the present embodiment and a method for referring to various tables will be described.

(E-1. When Using Function Only Available in Some Image Forming Apparatuses)

Figure 16:
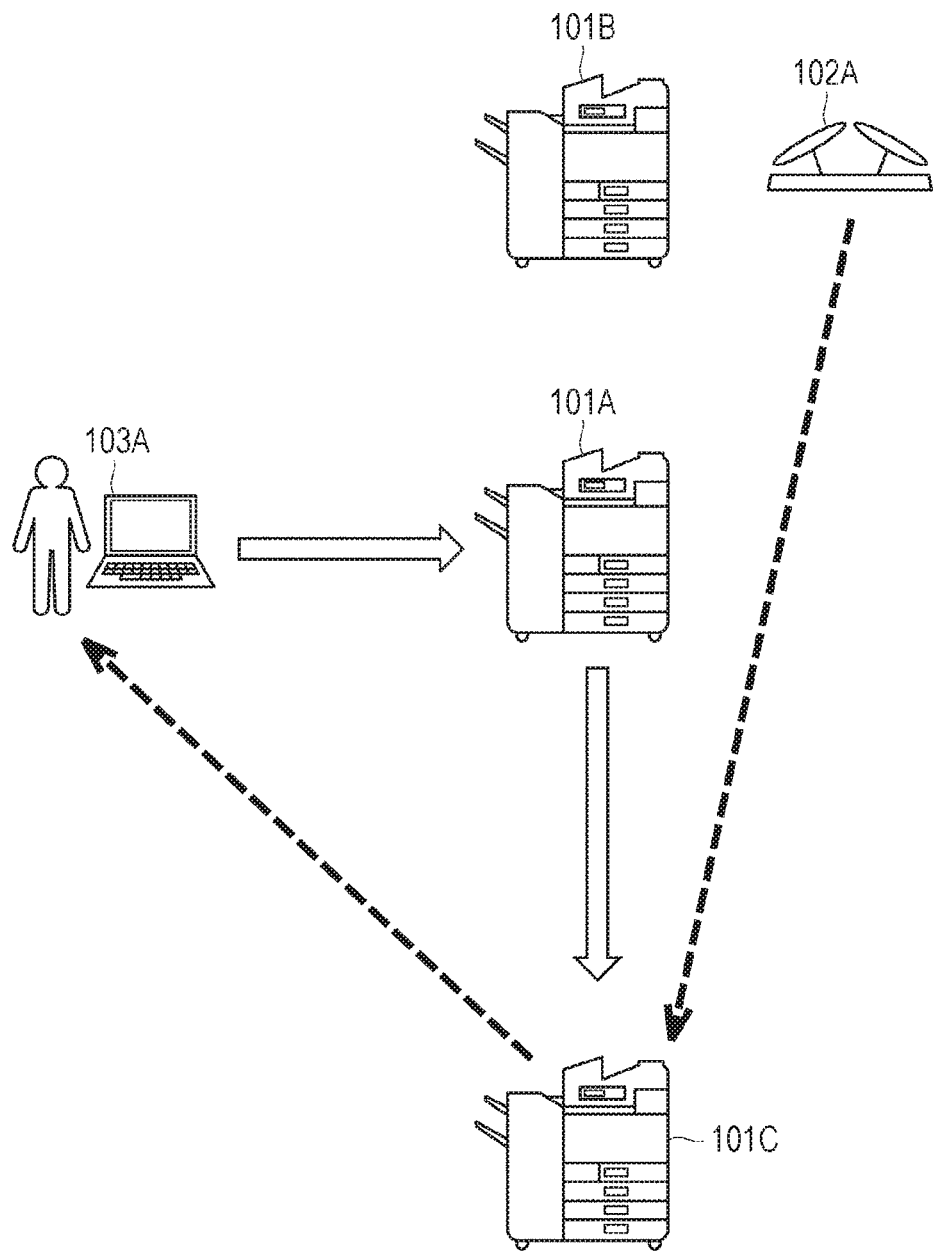
FIG. 16 is a diagram illustrating exemplary delivery of printed material in the case where a function only available in some image forming apparatuses is used.

FIG. 16 is a diagram illustrating exemplary delivery of printed material in the case where a function only available in some image forming apparatuses is used. The user of the terminal device 103A wants the flying vehicle 102 to deliver printed material having been subject to stapling to his/her seat. The image forming apparatus 101A and the image forming apparatus 101B do not have a stapling function, and the image forming apparatus 101C has a stapling function. Besides, it is assumed that the image forming apparatuses 101A, 101B, and 101C have the same print speed. The image forming apparatus 101B is located closer to the terminal device 103A than the image forming apparatus 101C.

The terminal device 103A transmits a print job including delivery designation to its own device and a stapling instruction to the image forming apparatus 101A registered as a prescribed image forming apparatus 101 in its own device. The image forming apparatus 101A analyzes the print job, and detects that the print job includes the "delivery designation" and "stapling instruction".

First, the image forming apparatus 101A obtains the seat position of the delivery destination. In a case where the delivery destination is specified by a staff member name, the image forming apparatus 101A searches the column of the name 802 in the staff member table 411, and obtains the corresponding staff member identifier 801. Next, the image forming apparatus 101A searches the seat table 412 on the basis of the obtained staff member identifier 801, and obtains the corresponding map identifier 902. Next, the image forming apparatus 101A searches the office map 410 on the basis of the obtained map identifier 902, and obtains the physical position 703 of the delivery destination. In a case where the delivery destination is specified by a seat name, the image forming apparatus 101A starts searching from the seat table 412.

Next, the image forming apparatus 101A refers to the column of the function 1204 in the device table 414, and obtains the position of the image forming apparatus 101 that can execute stapling. At the same time, it is determined whether or not the flying vehicle 102 is located on the searched image forming apparatus 101. The image forming apparatus 101A refers to the column of the function 1204 in the device table 414, and obtains the device identifier 1201, the position 1202, and the moving vehicle set flag 1206 of the image forming apparatus 101 having the stapling function. Note that the image forming apparatus 101A may omit the image forming apparatus 101 that cannot immediately execute the print job, such as the one with the status 1205 of "printing" or "out of order", from the search result. Next, the image forming apparatus 101A searches the office map 410 on the basis of the obtained position 1202, and obtains the physical position 703 of the delivery destination.

Next, the image forming apparatus 101A obtains the current position and destination of the flying vehicle 102 that can deliver the printed material. The image forming apparatus 101A searches the moving vehicle table 413, and obtains the IP address 1002, the current position 1004, and the destination 1005 of the flying vehicle 102 with the status 1006 of "free". The IP address 1002 is used for communication with the flying vehicle 102.

As described above, the image forming apparatus 101A obtains the delivery destination and the information associated with the image forming apparatus 101 and the flying vehicle 102, and executes the flow of FIGS. 15A and 15B, whereby the combination of the image forming apparatus 101C and the flying vehicle 102A can be appropriately selected.

Figure 17:
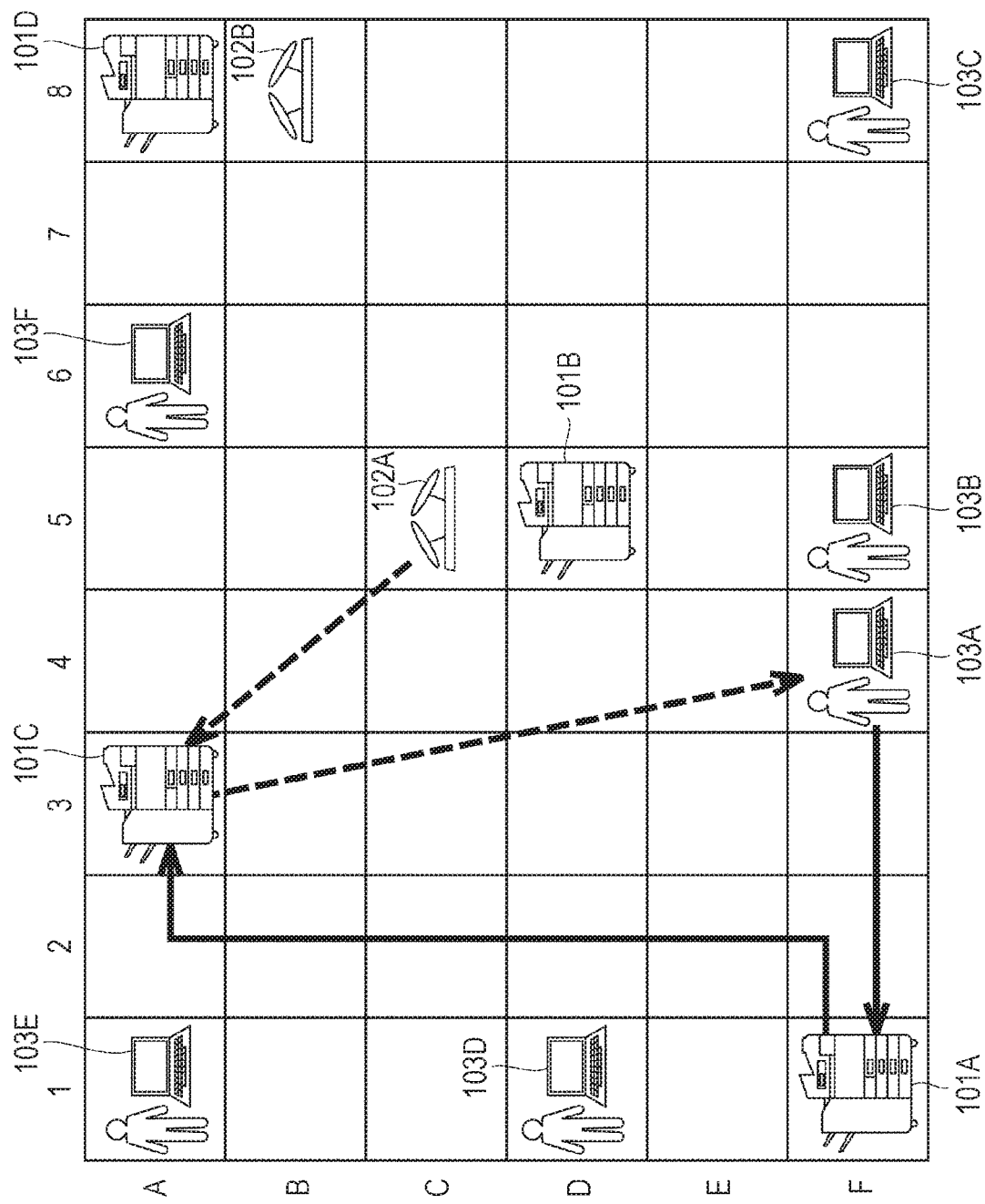
FIG. 17 is a diagram illustrating an exemplary office state corresponding to FIG. 16.

FIG. 17 is a diagram illustrating an exemplary office state corresponding to FIG. 16. Since the flying vehicle 102A is located in the immediate vicinity of the image forming apparatus 101B, the delivery time of the printed material becomes the shortest if the image forming apparatus 101B executes the print job. However, since the image forming apparatus 101B does not have a stapling function, the image forming apparatus 101A excludes the image forming apparatus 101B from the candidates for the transfer destination of the print job. Then, the image forming apparatus 101A selects the image forming apparatus 101C having a stapling function, and transmits, to the flying vehicle 102A, a command for collecting the printed material from the image forming apparatus 101C.

(E-2. When Amount of Printed Material is Large)

Figure 18:
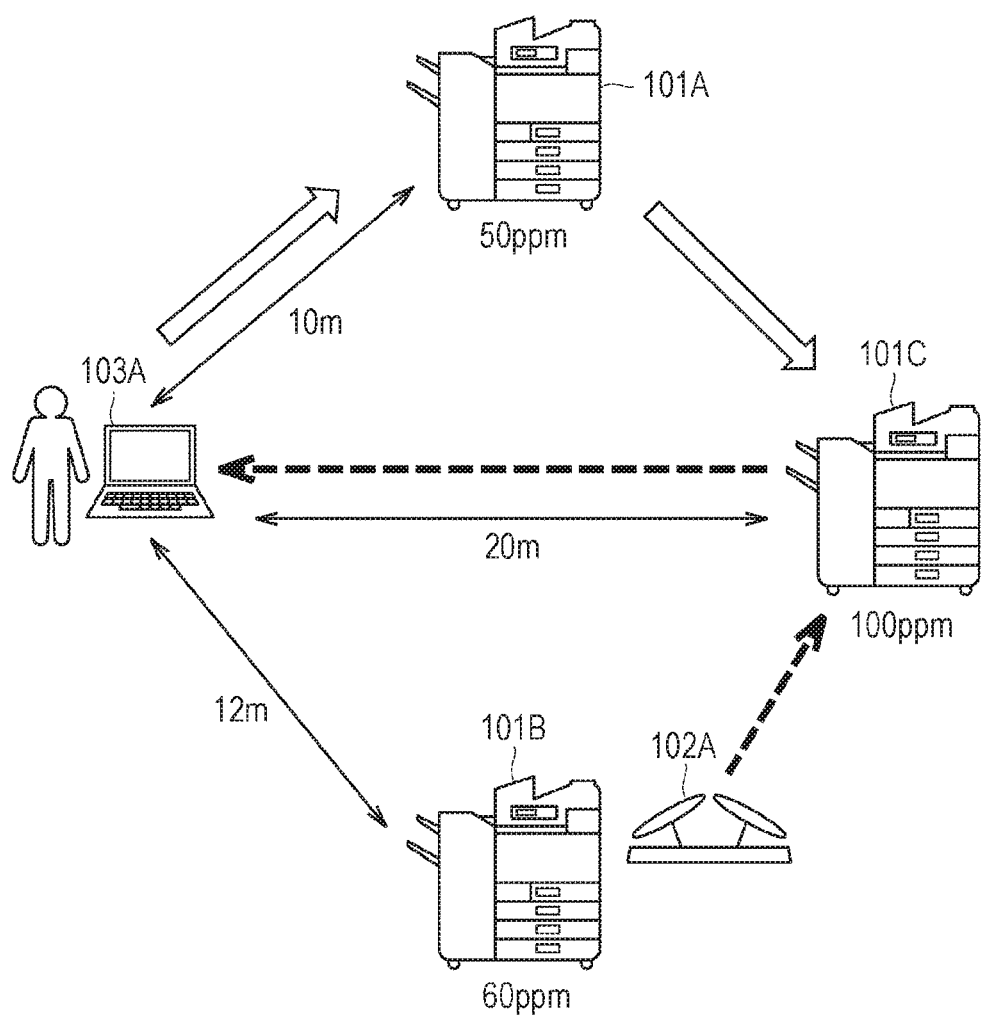
FIG. 18 is a diagram illustrating exemplary delivery of printed material in the case where an amount of the printed material is large.

FIG. 18 is a diagram illustrating exemplary delivery of printed material in the case where an amount of the printed material is large. The user of the terminal device 103A wants the flying vehicle 102 to deliver printed material to his/her seat. The image forming apparatus 101A is the prescribed image forming apparatus 101 of the terminal device 103A. The image forming apparatus 101B is located closer to the terminal device 103A than the image forming apparatus 101C. The print speed increases in descending order of the image forming apparatus 101C (100 ppm), the image forming apparatus 101B (60 ppm), and the image forming apparatus 101A (50 ppm). The flying vehicle 102A is located near the image forming apparatus 101B.

The terminal device 103A transmits the print job to the image forming apparatus 101A registered in its own device as the prescribed image forming apparatus 101. The image forming apparatus 101A analyzes the print job, and detects that the print job includes "delivery designation".

The flying vehicle 102A is located near the image forming apparatus 101B. Accordingly, in a case where the number of sheets to be printed set in the print job is small (e.g., the number of sheets to be printed is five sheets or less), the image forming apparatus 101A can reduce the delivery time by transferring the print job to the image forming apparatus 101B. However, in a case where the number of sheets to be printed set in the print job is large (e.g., the number of sheets to be printed is 50 sheets or more), the flying vehicle 102A has to wait until the image forming apparatus 101B finishes printing, whereby the delivery time may be longer as a result.

Meanwhile, in a case where the image forming apparatus 101A transfers the print job to the image forming apparatus 101C, the delivery time may be saved more than that in the case where the image forming apparatus 101A selects the image forming apparatus 101B if the image forming apparatus 101C completes the printing faster. That is, in the case where "printing time of the image forming apparatus 101C+ travel time of the flying vehicle 102A" is shorter than "printing time of the image forming apparatus 101B+travel time of the flying vehicle 102A", it can be said that the delivery time is shortened although the travel distance of the flying vehicle 102A increases. Note that the waiting time of the flying vehicle 102 during printing of the image forming apparatus 101 may not be included in the travel time of the flying vehicle 102.

In a similar manner to the descriptions of FIG. 16, the image forming apparatus 101A refers to the office map 410, the staff member table 411, the seat table 412, the moving vehicle table 413, and the device table 414, and selects the image forming apparatus 101C and the flying vehicle 102A that minimize the delivery time.

Figure 19:
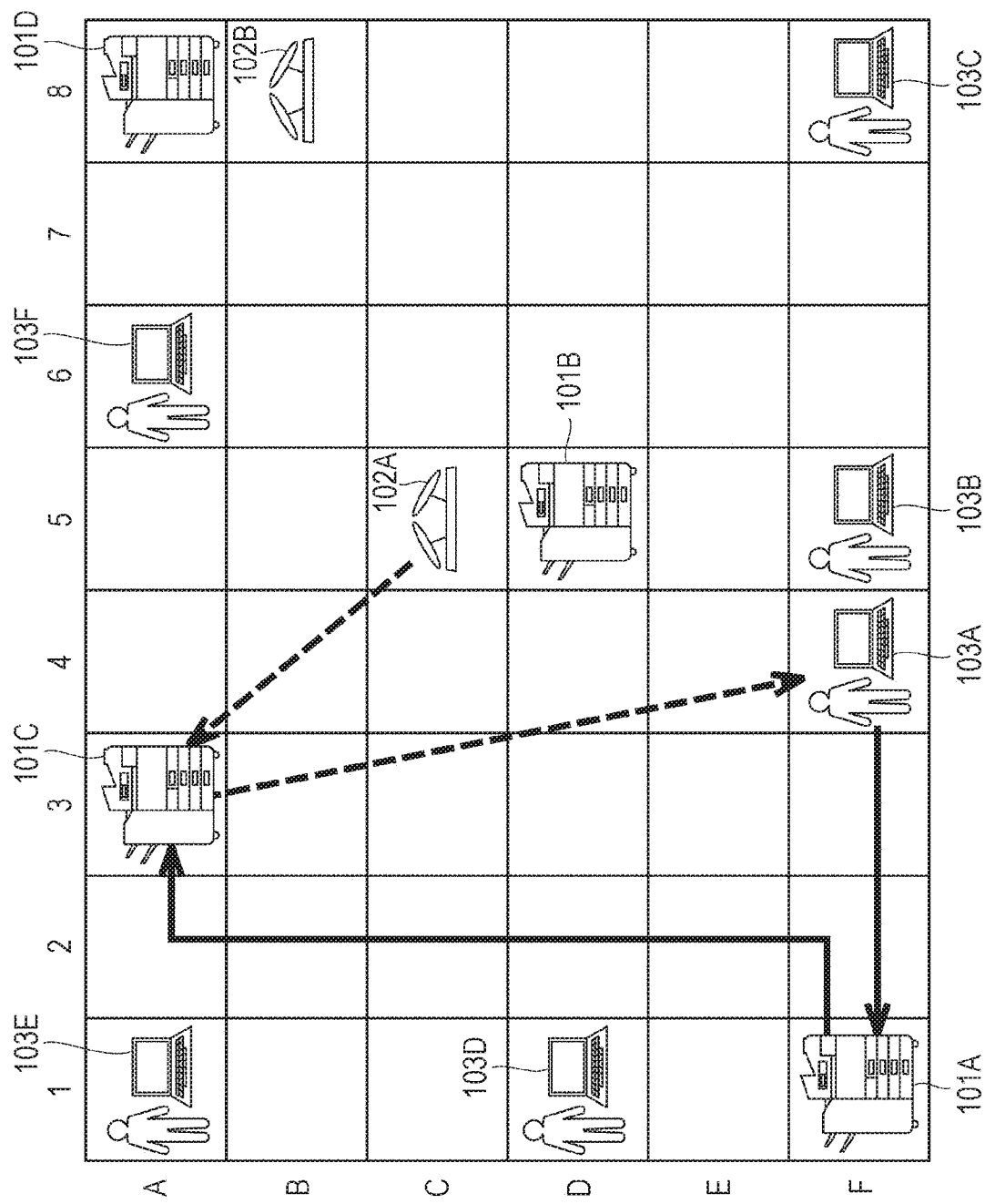
FIG. 19 is a diagram illustrating an exemplary office state corresponding to FIG. 18.

FIG. 19 is a diagram illustrating an exemplary office state corresponding to FIG. 18. The terminal device 103A transmits a print job to the image forming apparatus 101A. The image forming apparatus 101A transfers the print job to the image forming apparatus 101C. The image forming apparatus 101C executes the received print job. The flying vehicle 102A heads to the image forming apparatus 101C while the image forming apparatus 101C is performing printing, collects printed material from the image forming apparatus 101C, and delivers the printed material to the seat at which the terminal device 103A is located.

(E-3. When Some Image Forming Apparatuses 101 are Not Available)

Figure 20:
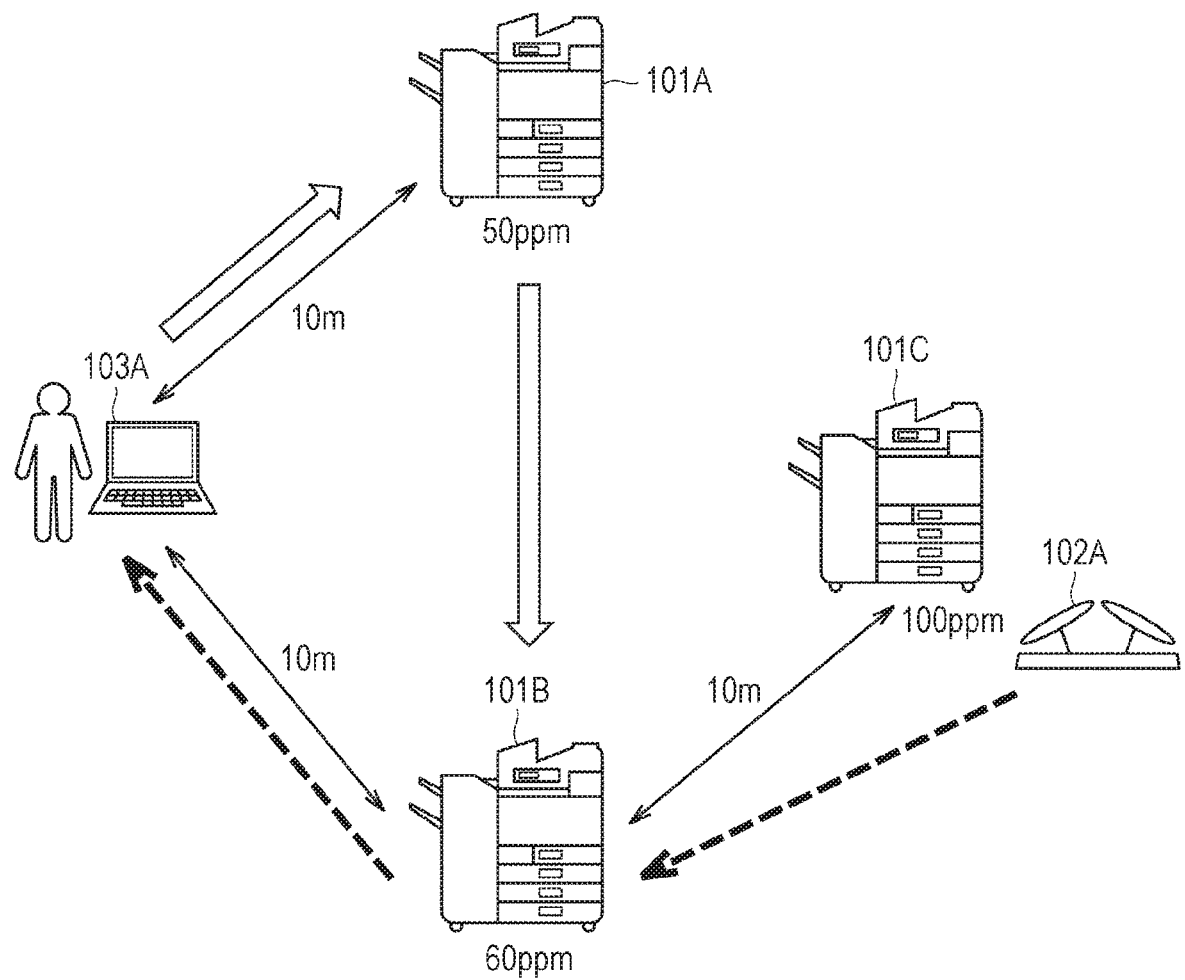
FIG. 20 is a diagram illustrating exemplary delivery of printed material in the case where some image forming apparatuses cannot be used.

FIG. 20 is a diagram illustrating exemplary delivery of printed material in the case where some image forming apparatuses 101 cannot be used. The user of the terminal device 103A wants the flying vehicle 102 to deliver printed material to his/her seat. The image forming apparatus 101A is the prescribed image forming apparatus 101 of the terminal device 103A. The image forming apparatus 101B is located closer to the terminal device 103A than the image forming apparatus 101C. The print speed increases in descending order of the image forming apparatus 101C (100 ppm), the image forming apparatus 101B (60 ppm), and the image forming apparatus 101A (50 ppm). The flying vehicle 102A is located near the image forming apparatus 101C. Further, the image forming apparatus 101C is in the state of not being able to perform printing due to running out of paper.

The terminal device 103A transmits a print job including delivery designation to the image forming apparatus 101A registered in its own device as the prescribed image forming apparatus 101. The image forming apparatus 101A analyzes the print job, and determines that the "delivery designation" is included. In a similar manner to the descriptions of FIG. 16, the image forming apparatus 101A refers to the office map 410, the staff member table 411, the seat table 412, the moving vehicle table 413, and the device table 414.

The combination that minimizes the delivery time includes the image forming apparatus 101C and the flying vehicle 102A. However, the image forming apparatus 101C cannot immediately perform printing due to running out of paper. In this case, the image forming apparatus 101A selects the image forming apparatus 101B and the flying vehicle 102A as a combination that provides the second smallest delivery time.

Figure 21:
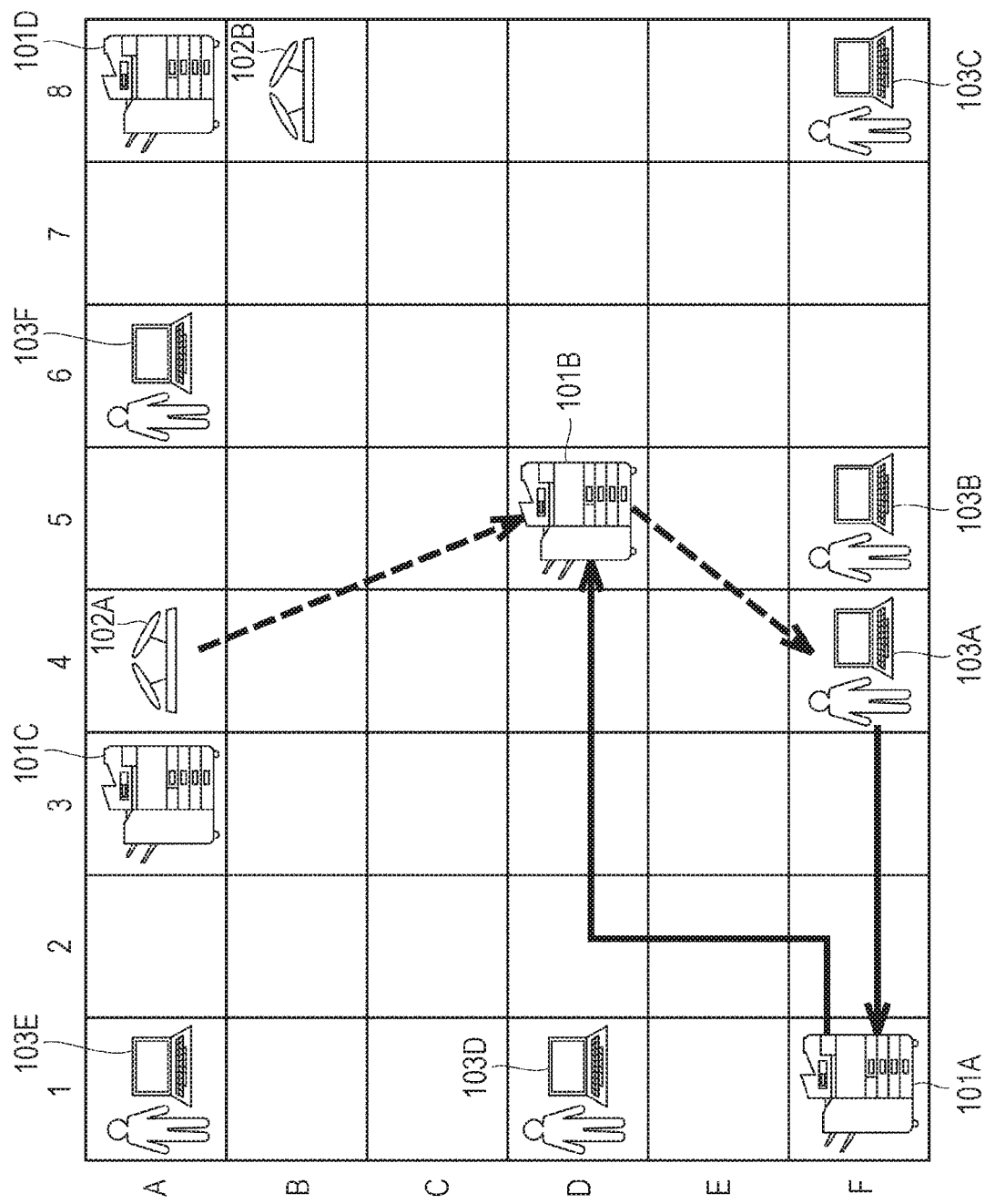
FIG. 21 is a diagram illustrating an exemplary office state corresponding to FIG. 20.

FIG. 21 is a diagram illustrating an exemplary office state corresponding to FIG. 20. The terminal device 103A transmits a print job to the image forming apparatus 101A. The image forming apparatus 101A selects the combination of the image forming apparatus 101B and the flying vehicle 102A for delivery of printed material to its own apparatus.

(E-4. When Selecting Flying Vehicle Depending on Remaining Battery Level)

The flying vehicle 102 that delivers printed material may be selected on the basis of a remaining battery level of each flying vehicle 102. For example, in step S1515 in the flowchart of FIGS. 15A and 15B, the controller 404 of the image forming apparatus 101A obtains a remaining battery level of each flying vehicle 102 by referring to the remaining battery level 1007 of the moving vehicle table 413.

In steps S1545 and S1584, the controller 404 of the image forming apparatus 101A calculates the battery consumption of the flying vehicle 102 and the remaining battery level after the delivery on the basis of the delivery distance. In step S1590, the controller 404 of the image forming apparatus 101A selects the flying vehicle 102 having the largest remaining battery level after the delivery.

By selecting the flying vehicle 102 on the basis of the remaining battery level and the battery consumption as described above, it becomes possible to efficiently operate the flying vehicle 102. Further, the image forming apparatus 101 may select the flying vehicle 102 on the basis of a combination condition of the delivery time, the battery consumption, and the remaining battery level.

As described above in detail, the delivery time of the printed material can be minimized according to the printed material delivery system of the present embodiment. Further, in one aspect, an optimal combination of the image forming apparatus 101 and the flying vehicle 102 can be selected on the basis of a remaining battery level of the flying vehicle 102.

Although embodiments of the present invention have been described and illustrated in detail, the disclosed embodiments are made for purposes of illustration and example only and not limitation. The scope of the present invention should not be interpreted by terms of the descriptions above but by terms of the appended claims, and it is intended to include all modifications in the meanings equivalent to and within the scope of the claims

What is claimed is:

1. An image forming apparatus that cooperates with a flying vehicle, the image forming apparatus comprising:
    a communicator that exchanges data with another device;
    a printer that performs printing on a paper sheet;
    a storage that stores positional information of a plurality of seats, positional information of a plurality of image forming apparatuses, and a moving speed of the flying vehicle; and
    a hardware processor that controls the image forming apparatus, wherein
    the hardware processor is to:
        obtain delivery destination information from a print job received via the communicator;
        receive positional information from the flying vehicle via the communicator;
        read out the positional information of a seat as a delivery destination and the positional information of the image forming apparatuses from the storage;
        calculate a travel time until the flying vehicle reaches the delivery destination after passing through any one of the image forming apparatuses on the basis of the positional information of the seat as a delivery destination, the positional information of the image forming apparatuses, and the moving speed and the positional information of the flying vehicle;
        transfer the print job to another image forming apparatus that minimizes a delivery time at a time when the flying vehicle collects printed material and delivers the printed material to the delivery destination on the basis of a result of the calculation of the travel time until the delivery destination is reached; and
        transmit information regarding the other image forming apparatus to the flying vehicle via the communicator.

2. The image forming apparatus according to claim 1, wherein
    the hardware processor is to:
    refer to the print job received via the communicator;
    transfer the print job to another image forming apparatus that minimizes a delivery time at a time when the flying vehicle collects printed material and delivers the printed material to the delivery destination on a basis a result of calculation of a distance until the delivery destination is reached in a case where the print job includes a first setting; and
    transfer the print job to another image forming apparatus that minimizes a travel distance at the time when the flying vehicle collects the printed material and delivers the printed material to the delivery destination on the basis the result of the calculation of the distance until the delivery destination is reached in a case where the print job includes a second setting.

3. The image forming apparatus according to claim 1, wherein
    the storage further stores print speeds of the image forming apparatuses in association with each other, and
    the hardware processor selects, on the basis of the print speeds of the image forming apparatuses and the positional information of the flying vehicle, the image forming apparatus in such a manner that the delivery time is minimized.

4. The image forming apparatus according to claim 1, wherein
    the storage further stores statuses of the image forming apparatuses, and
    the hardware processor excludes an image forming apparatus that cannot execute the print job from a candidate for a transfer destination of the print job on the basis of the statuses of the image forming apparatuses.

5. The image forming apparatus according to claim 1, wherein
    the hardware processor is to:
    obtain a print setting from the print job;
    search for, from among the image forming apparatuses, a list of image forming apparatuses capable of performing printing based on the print setting; and
    select an image forming apparatus to which the print job is transferred from the list of the image forming apparatuses capable of performing printing based on the print setting.

6. The image forming apparatus according to claim 5, wherein
    the storage stores the positional information of the image forming apparatuses and functions of the image forming apparatuses in association with each other, and
    the hardware processor refers to the functions of the image forming apparatuses and searches the list of the image forming apparatuses capable of performing printing based on the print setting.

7. The image forming apparatus according to claim 1, wherein
    calculation of a distance until the delivery destination is reached includes:
    calculating an expected position of the flying vehicle at a scheduled time when the print job is complete; and
    calculating the distance until the delivery destination is reached at a time when the flying vehicle starts flight from the expected position.

8. The image forming apparatus according to claim 1, wherein
    the print job can be set with a destination other than an issuer of the print job.

9. The image forming apparatus according to claim 1, further comprising:
    a charging stand on which the flying vehicle can land.

10. The image forming apparatus according to claim 1, wherein
    the hardware processor is to:
    receive, from a terminal that registers the image forming apparatus as a prescribed image forming apparatus, the print job in which the delivery destination is the terminal via the communicator;
    receive a destination from the flying vehicle via the communicator; and cause the printer to perform printing on a paper sheet without transferring the print job on the basis of the destination being the image forming apparatus.

11. The image forming apparatus according to claim 10, wherein
the hardware processor is to:
periodically receive the destination from the flying vehicle via the communicator;
store the destination in the storage; and
refer to the destination in the storage on the basis of the print job being received.

12. The image forming apparatus according to claim 11, wherein
the storage further stores a current position of the flying vehicle and a delivery status of the print job, and
the hardware processor excludes the flying vehicle with the delivery status of during delivery from options on the basis of selecting one of a plurality of the flying vehicles.

13. The image forming apparatus according to claim 1, further comprising:
a wireless communicator that wirelessly communicates with the flying vehicle, wherein
the hardware processor estimates the positional information of the flying vehicle on the basis of wireless communication strength between the image forming apparatuses installed in a room and the flying vehicle.

14. The image forming apparatus according to claim 1, wherein
the storage further includes information regarding an area obtained by dividing the room into certain areas, and
the hardware processor manages the positional information of the flying vehicle in a unit of the area.

15. The image forming apparatus according to claim 1, wherein
the hardware processor manages the positional information of the seat in a unit of the area, and
the delivery destination information includes the positional information or the area of the seat.

16. The image forming apparatus according to claim 15, wherein
the storage stores user information and the positional information of the seat in association with each other, and
the hardware processor searches the storage on the basis of the user information included in the print job and obtains the positional information of the seat.

* * * * *